United States Patent

Makino et al.

[11] Patent Number: 5,843,386
[45] Date of Patent: *Dec. 1, 1998

[54] HYDROTHERMAL REACTION APPARATUS

[75] Inventors: Hisaaki Makino; Takehiko Moriya; Yoshihisa Saito, all of Miyagi-ken; Masazumi Kanazawa, Kochi-ken, all of Japan

[73] Assignees: Tohoku Electric Power Company, Inc.; Ohei Developmental Industries Co., Inc.

[ * ] Notice: This patent issued on a continued prosecution application filed under 37 CFR 1.53(d), and is subject to the twenty year patent term provisions of 35 U.S.C. 154(a)(2).

[21] Appl. No.: 631,812

[22] Filed: Apr. 10, 1996

[30] Foreign Application Priority Data

Apr. 20, 1995 [JP] Japan ................................. 7-095002
Mar. 29, 1996 [JP] Japan ................................. 8-076936

[51] Int. Cl.$^6$ ....................................................... B01J 3/00
[52] U.S. Cl. ..................... 422/203; 210/177; 210/178; 210/195.1; 210/205; 210/259; 422/234; 422/242
[58] Field of Search .................................. 210/136, 137, 210/149, 177, 178, 195.1, 205, 259; 422/202, 203, 234, 242

[56] References Cited

U.S. PATENT DOCUMENTS

| | | | |
|---|---|---|---|
| 4,053,404 | 10/1977 | Van Kirk | 210/761 |
| 4,217,218 | 8/1980 | Bauer | 210/761 |
| 4,272,383 | 6/1981 | McGrew | 210/149 |
| 4,338,199 | 7/1982 | Modell . | |
| 4,721,575 | 1/1988 | Binning et al. | 210/761 |
| 4,774,006 | 9/1988 | Kaufmann | 210/761 |
| 4,882,497 | 11/1989 | Inoue et al. . | |
| 5,054,108 | 10/1991 | Gustin et al. | 392/492 |
| 5,128,515 | 7/1992 | Tanaka | 219/390 |
| 5,133,877 | 7/1992 | Rofer et al. | 210/761 |
| 5,192,453 | 3/1993 | Keckler et al. | 210/761 |
| 5,372,725 | 12/1994 | Halff et al. | 210/761 |
| 5,401,140 | 3/1995 | Anderson | 417/63 |
| 5,431,889 | 7/1995 | Huang et al. | 422/202 |

FOREIGN PATENT DOCUMENTS 5177188  7/1993  Japan .

*Primary Examiner*—Jay H. Woo
*Assistant Examiner*—Betsey J. Morrison
*Attorney, Agent, or Firm*—Wolf, Greenfield & Sacks, P.C.

[57] ABSTRACT

A safe and efficient hydrothermal reaction apparatus is described herein. Decomposition or synthesis of object material is performed by the continuous passing of the material through a flow passage of multi-staged reactor units under turbulent flow conditions. The flow passage is formed by a curved or spiral piping. In each reactor unit, a hot plate block is included as a heating unit. The hot plate block and the curved piping are placed in an appropriate thermal contact relationship. A portion of the curved piping is freely supported, so as to accommodate stress caused in the piping under high-temperature/high-pressure conditions. A tank is provided for regulating or controlling the pressure fluctuation within the flow passage which may be caused by solids or powder present or occurring in the flow passage during high-pressure treatment. A portion of object material which has not been decomposed during the high-pressure treatment is again introduced or returned to the reactor for complete decomposition thereof after the addition of more solvent.

11 Claims, 20 Drawing Sheets

HYDROTHERMAL REACTION APPARATUS

BACKGROUND OF THE INVENTION

1. Field of the Invention

This invention relates to a hydrothermal reaction apparatus useful in decomposition or synthesis of materials to be treated. The apparatus is expected to be used in a variety of applications including decomposition of various kinds of wastes, and supercritical fluid reactions.

2. Description of the Prior Art

A hydrothermal reaction is a reaction in which high temperature, high pressure water and raw material are contacted and mixed with each other. A supercritical fluid reaction is a reaction in which, at high temperature and pressure, a supercritical fluid is used as a solvent in order to perform decomposition of various water materials, synthesis of organic and inorganic compounds, production of particulates, and to facilitate reaction between particulates. Raw materials to be treated include coal, heavy oil, rubber, waste plastic, excrement, PCB (polychlorobiphenyl). It has also been proposed that particulates may be produced through chemical reactions. It is noted, however, that such proposals are based on a laboratory scale. Thus, it is highly desired that a continuous treatment apparatus of a practical size be embodied which is indispensable for treatment of large amounts of raw materials encountered in industry.

A typical high-pressure treatment apparatus in prior art is described in Japanese Patent Publication No. 5-177188 (KOKAI HEI 5-177188). In this apparatus, material to be decomposed (object material) such as PCB, water or hydrothermal solvent, and reaction accelerator are contained in a decomposition reactor (autoclave) and then decomposed under a high temperature/high pressure condition. The above apparatus is of a batch type. Such apparatus includes, as shown in FIG. 1, a decomposition reactor (autoclave) 1. The decomposition reactor 1 includes a nitrogen gas cylinder 3 as pressure gas supply means, a pressure means 2 consisting of the nitrogen gas cylinder 3, and a heating means 4 such as electric heaters. Material to be decomposed (object material), water or hydrothermal solvent (solvent) 11 and reaction accelerator 12 are supplied in a given ratio to the decomposition reactor 1 through pipings 5, 6, 7 and pumps 8, 9, 10. The internal pressure within the decomposition reactor 1 is increased by means of the pressure means 2. Thereafter, the temperature in the reactor is adjusted at a selected value by means of the heating means 4. The object material is decomposed by maintaining the reactor at a high temperature/high pressure condition for a predetermined period of time. Then, the temperature in the reactor is decreased by de-energizing the heating means, while the internal pressure is decreased by opening a blow-off valve of the reactor. Then, a valve 14 of a decomposed liquid discharge means 13 is opened, and the reactor is pressurized by means of the pressure means 2, whereby a decomposed liquid is discharged into a decomposed liquid discharge tank 16. When solid materials are contained in the decomposed liquid, they are removed by means of a filter 17. If it is intended for the apparatus to be operated in a continuous manner, raw liquid or feed liquid should be continuously supplied to the reactor 1 and decomposed liquid should be continuously discharged from the reactor in order to maintain liquid level in the reactor at a predetermined value. It is noted, however, that, in such a case, the decomposed liquid essentially contains therein a portion of the raw liquid when it is discharged from the reactor. Thus, insufficient treatment is expected when such prior art apparatus is operated in a continuous manner.

Japanese Patent Public Disclosure No. 4-284886 (KOKAI HEI 5-284886) proposed a system in which feed material is supplied by means of a high-pressure injection pump into a vertical reaction tower consisting of straight pipes for continuous treatment thereof. In this system, water in a water tank 20 and feed material in a feed liquid tank 18 are displaced by means of a compressor 19 through a piping 21 into a reaction tower 29 consisting of a straight pipe having heating means thereon 30, as shown in FIG. 2. Before reaching the reaction tower 29, the water and the feed material are admixed (dilution of the feed material) by connecting pipings 22 and 23, and introduced through a piping 24 into a heat exchanger 28 having a high-pressure injection pipe 25, piping 26 and piping 27. Treated liquid is discharged from piping 30B connected to the outlet port of the reaction tower through the heat exchanger 28, a cooler 30C and a pressure reducing valve 30D. In this continuously treating apparatus, various pipings i.e., the piping for feeding the material to be decomposed (object material), the piping for supplying reaction accelerator, the heat-exchanging pipings disposed upstream and downstream of the reaction tower, the vertical straight piping within the reaction tower, and the piping for discharging the treated liquid are employed. Thus, the entire flow passage is very complicated, though reactant liquid (liquid to be reacted) may flow through the straight piping within the reaction tower simply in the vertical direction.

In order to perform treatment of object material (feed material) under high-pressure/high temperature by means of hydrothermal reaction in a stable and efficient manner, it is necessary for the object material and water or hydrothermal solvent to be sufficiently admixed and contacted with each other and such condition should be maintained until such reaction has been completed. It is also necessary for the reaction temperature, pressure and treatment capacity (flow rate) of the reactant material to be kept at a constant value, or to be adjustably controlled. Specifically, object material to be decomposed including water or solvent, are significantly contacted with each other during decomposition due to a hydrothermal reaction process, so that such reaction is facilitated and treatment efficiency is increased. If such contact or mixing is insufficiently performed, reaction efficiency becomes very low, so that the intended treatment is not achieved, resulting in a process that could not be used practically.

When the object material to be decomposed is solid or powder, it is not completely decomposed under a certain treatment condition, thus remaining in the form of solid or powder. When water and solid are not sufficiently admixed, such water and solid or powder are separated in two phases or layers. Thus, a heterogeneous field is created within the apparatus, so that a stable reaction is not expected. Even when the object material is liquid, efficient reaction would not be expected, if the object material, solvent and reaction accelerator are not sufficiently admixed and passed through the reactor in separate forms. When a by-product in powder form is generated during the decomposition process, there is no problem if such powder and fluid are evenly admixed and transported smoothly. It is noted, however, that problems may be caused if there is a difference in moving velocity between powder and fluid. Such problems may result in blockage in the reaction in the reaction system due to coagulation of powder therein or blockage in a pressure reducing valve due to the passage of massive powder therethrough. Similar problems may be caused when a solid product or a powder product is intentionally generated in a hydrothermal treatment process.

If the above prior art technique could be practically used, it is impossible to perform certain operations such as agitation within a large-sized reactor vessel of a batch type. Thus, it is not expected for the water and object material to be decomposed to be sufficiently admixed. When decomposed liquid contains solids therein, it is necessary for the decomposed liquid and solids to be extracted from the reactor vessel for removing such solids by means of a filter. It is noted, however, that is practically difficult to safely extract decomposed liquid and solids from the reactor vessel at high-temperature and high-pressure and to stably perform filtration operation by means of a filter under high-pressure conditions.

Another problem relating to the batch type high-pressure treatment is an operational problem included when setting the reaction time, reaction temperature, treatment capacity (flow rate) and the like. With the batch type treatment, operational conditions depend upon the given reactor vessel, so that a wide variety of operational conditions could not be selected. For example, a temperature gradient within the reactor vessel is required to be variously controlled in accordance with a given material to be treated. It is noted, however, that, with the batch type treatment, the temperature gradient could not be variously controlled.

For example, polyethylene may be very quickly decomposed in a supercritical water at about 500° C. into low molecular compounds such as straight chain hydrocarbons e.g. paraffin and olefin, and aromatic compounds, or mixtures thereof. The above compounds such as paraffinic hydrocarbons and olefinic hydrocarbons may be modified into aromatic compounds by controlling the temperature of such supercritical water and treatment time. In order to perform continuous decomposition of polyethylene at high speed and subsequent continuous modification reaction processes, it is necessary to continuously and selectively control the reaction temperature and time, to change the temperature at an appropriate time, to conduct injection of reaction controller (accelerator, inhibitor) such as hydrogen gas at an appropriate time, and to selectively control the reaction. In order to permit various object materials other than polyethylene to be decomposed, high-pressure treatment processes should be realized in which treatment conditions, such as treatment time and temperature control, may be variously changed.

In the above-mentioned continuous treatment process, the straight pipe of the reaction tower may have an inner diameter of above 20 mm and an entire length of about 2,890 mm, as exemplified in the prior art documents, and thus its volume is strictly restricted. Thus, it is difficult to variously select treatment capacity (flow rate) and reaction time. If the straight pipe is increased in its diameter in order to obtain higher treatment capacity, heat capacity of such pipe will be disadvantageously increased in proportion to its increased volume. Thus, it is difficult to obtain efficient heating and preservation of temperature. If the reaction tower is increased in its height, it is also difficult to preserve reaction temperature and temperature gradient.

A reaction device operated at high-pressure and high-temperature, is very dangerous if any damaged is caused thereto. In particular, any troubles leading to burst-out of liquid to be decomposed during treatment should be avoided. Connection portions or connectors requiring seal material which may invite such troubles should be avoided. In the above-mentioned high-pressure treatment apparatus, the reactor tower-reactor vessel includes high pressure piping which is different to the inflow piping for the material to be treated. This means that there is difference in inner diameter between the inflow piping for the material to be treated and the reaction tower or reactor vessel, and between the reactor tower or reactor vessel and the outflow piping. This causes changes in flow velocity, and intermittent flow within the flow line. By this, it is difficult to analyze or determine the phase of each of the hydrothermal solvent and the object material to be decomposed within the reactor tower or reactor vessel. This makes it difficult to appropriately design the apparatus.

This invention provides a safe hydrothermal reaction apparatus which ensures that the object material to be decomposed or synthesized under high pressure, to be sufficiently and evenly admixed so as to obtain a continuous flow, while facilitating selective settings and preservation of reaction condition such as reaction time, reaction temperature, temperature gradient, flow rate and pressure, thus enabling a stable reaction process.

SUMMARY OF THE INVENTION

The present invention provides a hydrothermal reaction apparatus comprising: means for injecting object liquid to be treated including object material, water or hydrothermal solvent, reaction accelerator and the like; a reactor in communication with the injecting means and including heating means for maintaining the object liquid at high-temperature/high pressure condition for treatment of the object liquid; pressure reducing means in communication with the reactor for discharging treated liquid; the reactor including a curved piping forming a flow passage for the object liquid.

The featured hydrothermal reaction apparatus of the invention comprises a reactor in the form of curved piping and includes a plurality of reactor units, each reactor unit including individually controllable unified heating means. The unified heating means may include a hot plate block of a heat conductive material formed with a plurality of apertures, and cartridge heaters disposed in the apertures.

In the featured hydrothermal reaction apparatus of the invention a portion of the piping is arranged closely to the hot plate block of the heating means, and a portion of the piping is freely supported. The heating means may include an induction heater for quickly increasing the temperature of the object liquid to a predetermined value, and warmer means for maintaining the temperature of the object liquid in a predetermined range of reaction temperatures, wherein the induction heater is disposed at a conduit communicating between the object liquid injection means and the curved piping, and wherein the warmer means is disposed around the curved piping. The reactor including the curved piping may be constituted by a plurality of reactor units, each of the reactor units including a warmer means which is individually controllable.

In the featured hydrothermal reaction apparatus the reactor units are individually controllable in terms of temperature setting and temperature adjustment.

The pressure reducing means may include means for supplying high-pressure gas to be balanced with the pressure of the treated liquid supplied from the reactor, and a pressure regulation tank in communication with an automatic open/close valve for discharging the treated liquid.

The pressure within the tank may be maintained in a redetermined range of pressure by controlling gas supply from the high-pressure gas supply means, and liquid level of the treated liquid within the tank may be maintained in a predetermined range by controlling the automatic open/close valve. The object liquid injection means may include a tank for receiving therein the object liquid, and a high-pressure injection pump in communication with the receiver tank through a flow passage change-over valve, whereby a quantity of water may be supplied upon starting of the apparatus by changing the flow passage using the change-over valve. The high-pressure pump may be a cylinder pump. An object liquid injection pump for compensation of pressure includes a cylinder pump that may be disposed at a communication portion between the object liquid injection means and the reactor, whereby, when liquid pressure is decreased due to the displacement of the cylinder pump of the object liquid injection means, a quantity of the object liquid may be injected by means of the pressure compensation pump for compensating the decrease in liquid pressure.

In the featured hydrothermal reaction apparatus of the invention, a plurality of the object liquid injection means are in communication with the reactor, and the object material to be treated, (the hydrothermal solvent and the reaction accelerator), are separately contained in the object liquid receiver tank, whereby they are separately injected. A plurality of the object liquid receiver tanks may be provided for separately containing the object material, each of the receiver tanks being in communication with the high-pressure injection pump through a flow passage change-over valve and a flow regulator, whereby the object material may be admixed at a predetermined ratio by means of the flow regulator. A reaction inhibitor injection means including a tank and a high-pressure injection pump may be in communication, through a check valve, with a communication portion between selected two of the reactor units of the reactor including the plurality of reactor units, whereby a quantity of the reaction accelerator, the reaction inhibitor or the hydrothermal solvent may be injected.

In an embodiment of this invention, a hydrothermal reaction apparatus has an object fluid receiving tank for accommodating an object material to be treated and a hydrothermal solvent containing water. A high pressure injection pump is in communication with the tank via a flow passage change over valve for switching to and from a water injecting passage and a reactor having a heating means formed of pipes in sequence. High pressure reducing means is provided. Object fluid can be forced into the reactor by means of the high pressure injection pump and a thermally decomposed fluid after suitable treatment can be discharged via the pressure reducing means. The apparatus is characterized by the reactor being composed of a preheater and a warmer formed of curved pipes and a quick heating means provided in piping that connects the preheater to the warmer. The flow passage change-over valve is constructed so that upon start of the apparatus, it communicates with the water injection passage so that water is injected into the reactor by means of the high pressure injection pump. The flow passage change-over valve is subsequently switchable to the object fluid receiving tank so that the object fluid can be forced into the reactor by means of the high pressure injection pump with pressure maintained at a level not lower than where water is about at a supercritical condition. The injected object fluid is preheated by means of the preheater to a temperature near the point where the reaction starts and then rapidly heated by the quick heating means to a reaction temperature not lower than a level where water is about at a super critical condition and subsequently warmed at the reaction temperature by means of the warmer while, at the same time opening of the pressure reducing means is controlled such that the object fluid flows through the pipes in the reactor under a turbulent condition to decompose the object material.

OPERATION

In accordance with the hydrothermal reaction apparatus of the invention, a flow passage included in a reactor unit is formed by a curved piping. High-pressure lines upstream and downstream of the piping may be formed by pipings of substantially the same inner diameter. A feed fluid to be treated mixed up with object material to be treated, water or hydrothermal solvent (solvent), and reaction accelerator is easily regulated to be in a turbulent flow region. It is possible for the feed material to be maintained in an appropriately and sufficiently mixed condition throughout the entire system whereby a stable reaction is realized. The reactor unit is formed in a spiral configuration, so that an increased treatment capacity is obtained in relation to the required space. Reaction time may be selectively set at a desired value by controlling flow rate.

The reaction portion is constituted by a unified piping wound in a spiral configuration and disposed around or within the hot plate block. A plurality of such reaction portions is disposed. Thus, each of the units may be independently controlled in its temperature. A temperature gradient is precisely controlled. Water or hydrothermal solvent (solvent) and reaction accelerator may be injected at an intermediate portion of the multi-staged reaction portions, so that different reaction conditions may be obtained in each of the first and second reaction portions.

The high-pressure line of the apparatus is constituted by pipings of substantially the same inner diameter. Thus, connection parts requiring seal may be minimized. Breakage of seal is minimized, so that extremely stable or reliable apparatus may be provided.

DETAILED DESCRIPTION OF THE PREFERRED EMBODIMENTS

Figure 1:
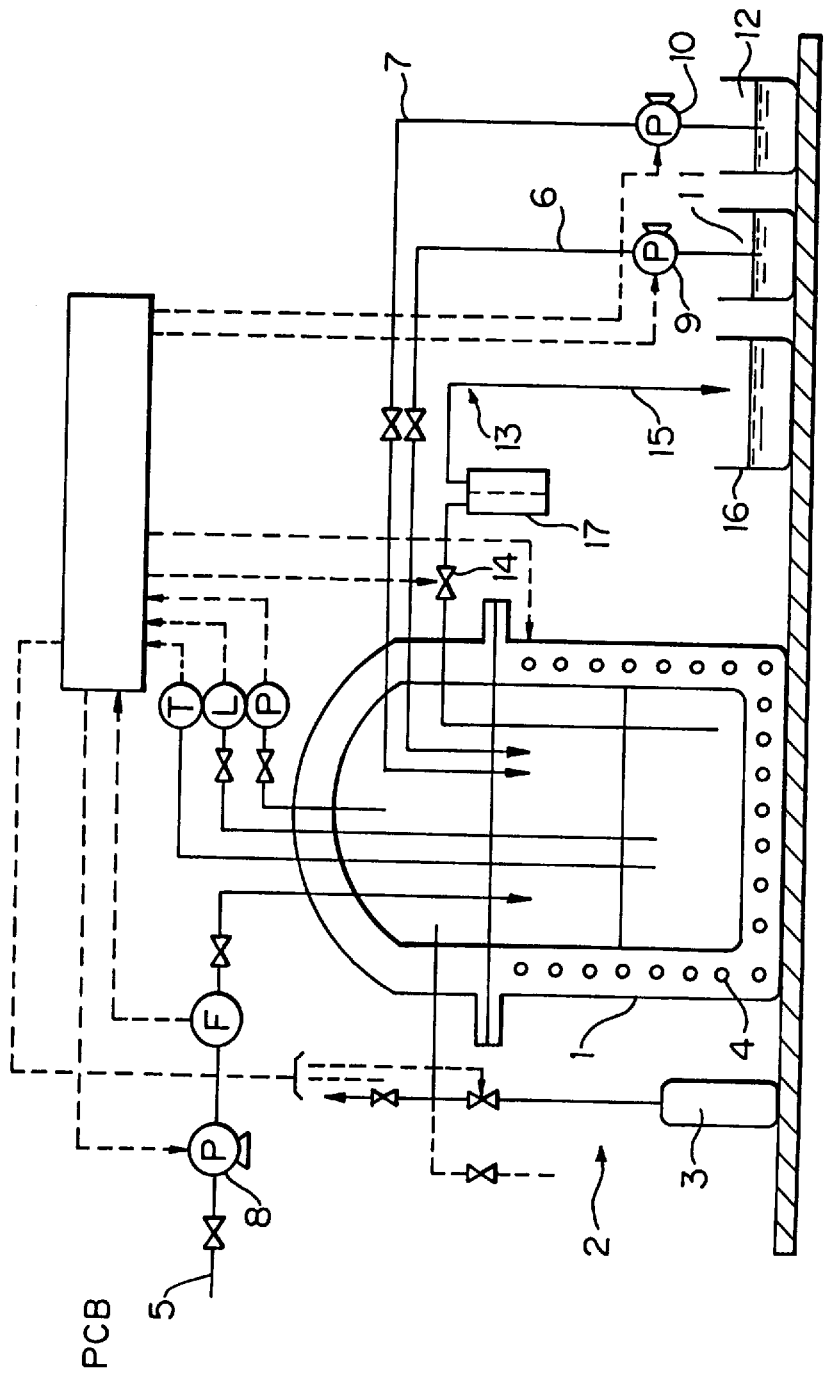
FIG. 1 is a diagrammatic view illustrating an example of a batch type treatment apparatus in the prior art.
Figure 2:
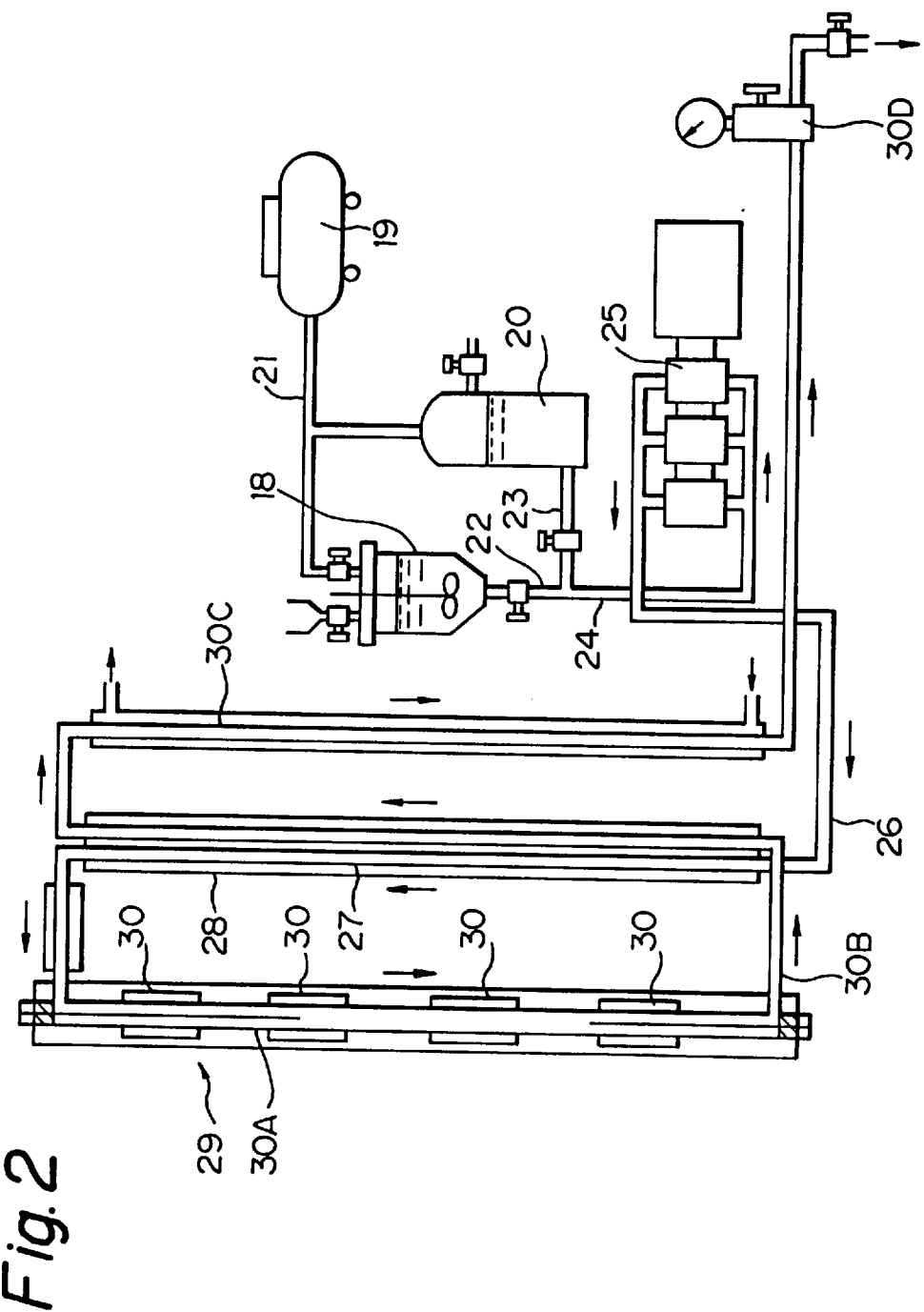
FIG. 2 is a diagrammatic view illustrating an example of a continuous treatment apparatus in the prior art.
Figure 3:
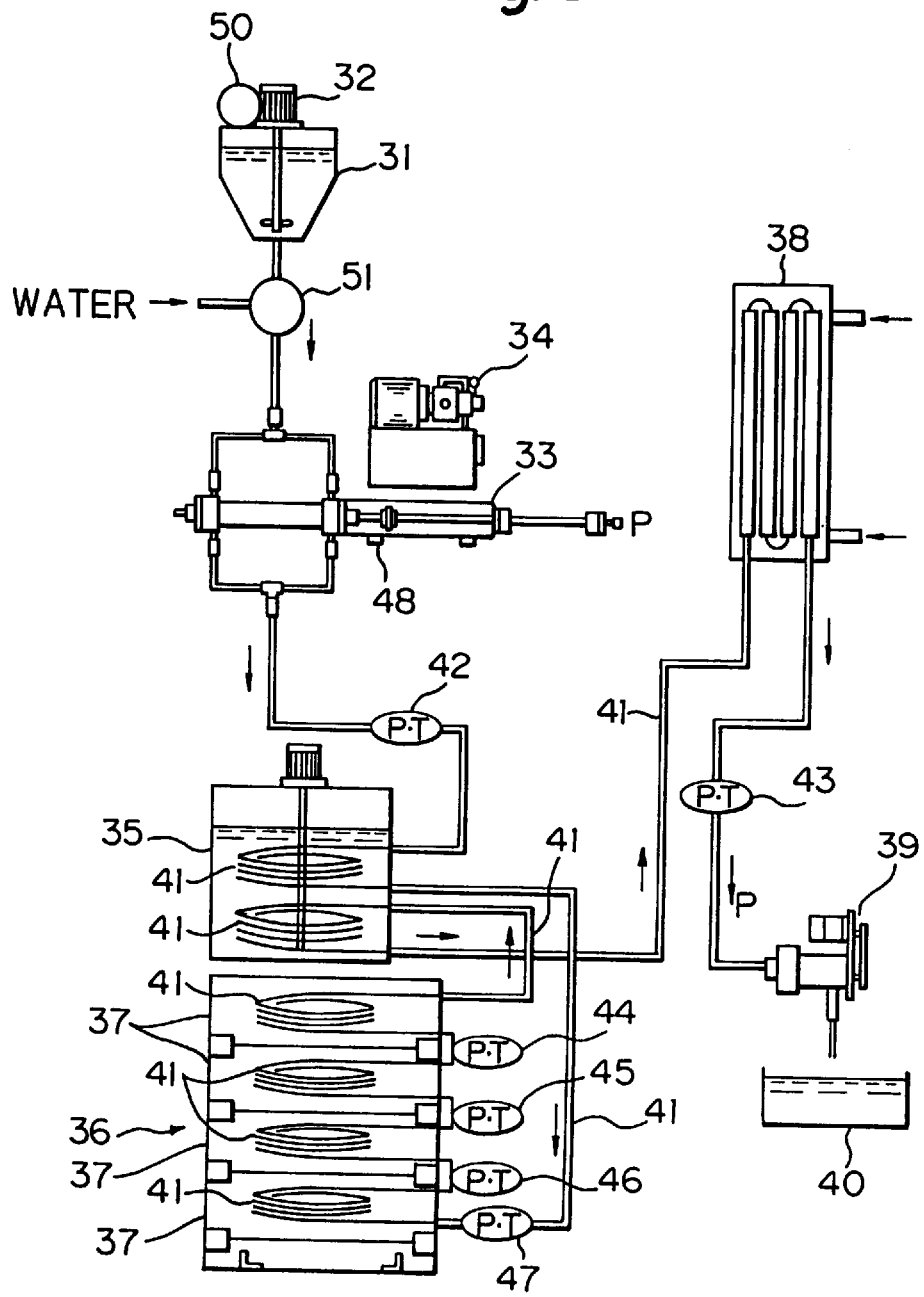
FIG. 3 is an explanatory view illustrating a hydrothermal reaction apparatus according to the invention.

FIG. 3 is an illustrative view showing one example of the hydrothermal reaction apparatus according to the invention. Reference numeral 31 denotes a tank having agitation means for a treatment liquid (material to be decomposed+solvent+reaction accelerator), 33 a high-pressure pump, 34 a hydraulic unit, 35 a heat exchanger, and 36 a reaction device or a reactor consisting of a multi-staged (4 stages in the drawing) reaction portion or reactor unit 37. Reference numeral 38 denotes a cooler, 39 a pressure reducing valve, 40 a tank for receiving treatment liquid, and 51 a flow passage changeover valve for switching to and from a water injection passage. The heat exchanger 35, the reaction device 36 and the cooler 38 include respective spiral or curved pipings 41 of the same diameter and connected relative to one another by means of respective pipings of the same diameter.

Since the above pipings have the same diameter, the pressure within such pipings can be regarded as the same value even when it is measured at any point of the pipings form the high-pressure pump 33 through to the pressure regulating valve 39. It is noted, however, that, in the drawing, the pressure within the pipings is measured at a point 42 between the high-pressure injection pump 33 and the heat exchanger 35, at a point 43 between the cooler 38 and the pressure regulating valve 43, and at points 44, 45, 46 and 47 within the reactor unit 37. Temperature of the fluid in the piping within the reactor (reaction temperature) is detected by the temperature/pressure detectors disposed at the positions 42, 43, 44, 45, 46 and 47 at which the above pressure detection is performed. Displacement of the cylinder pump is continuously detected by means of a rotary encoder 48 so as to determine flow rate. Such continuously detected output signals are all transmitted to a control computer and a control panel for indication thereof. Each portion is automatically controlled by the control computer so as to maintain respective set condition. The object liquid tank 31 is provided with a volume sensor or a liquid level sensor 50 so as to confirm volume of the liquid remaining in the tank. Various kinds of meters such as an ultrasonic level sensor may be used as a volume sensor. The flow rate, injection pressure and temperature control, together with start and stop operation of each of the reactor units 38 may be controlled by means of the control panel and the control computer.

Figure 4:
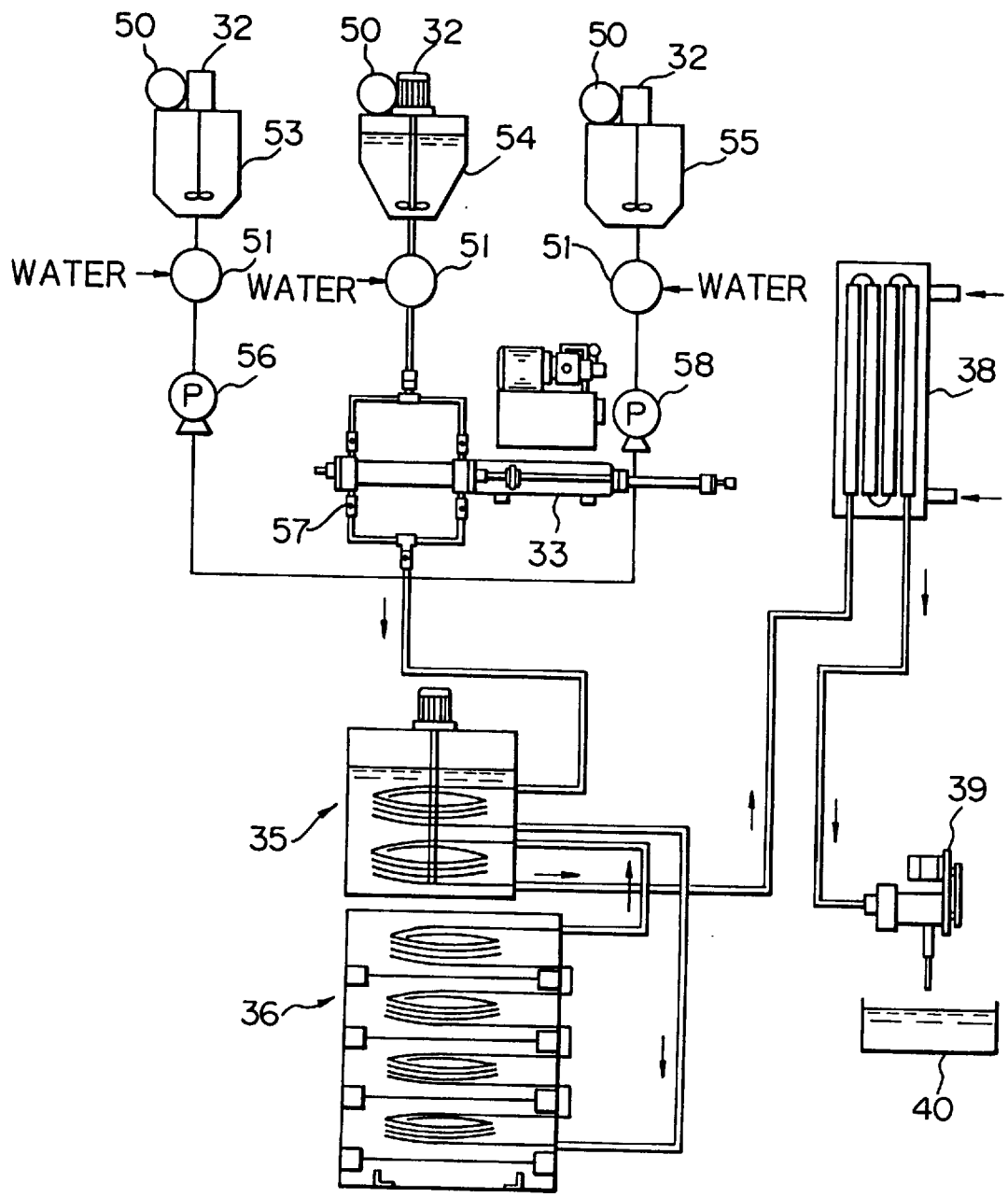
FIG. 4 is a diagrammatic view illustrating one example of the hydrothermal reaction apparatus in which feed rates of liquid to be treated, solvent and reaction accelerator may be individually or separately adjusted.
Figure 5:
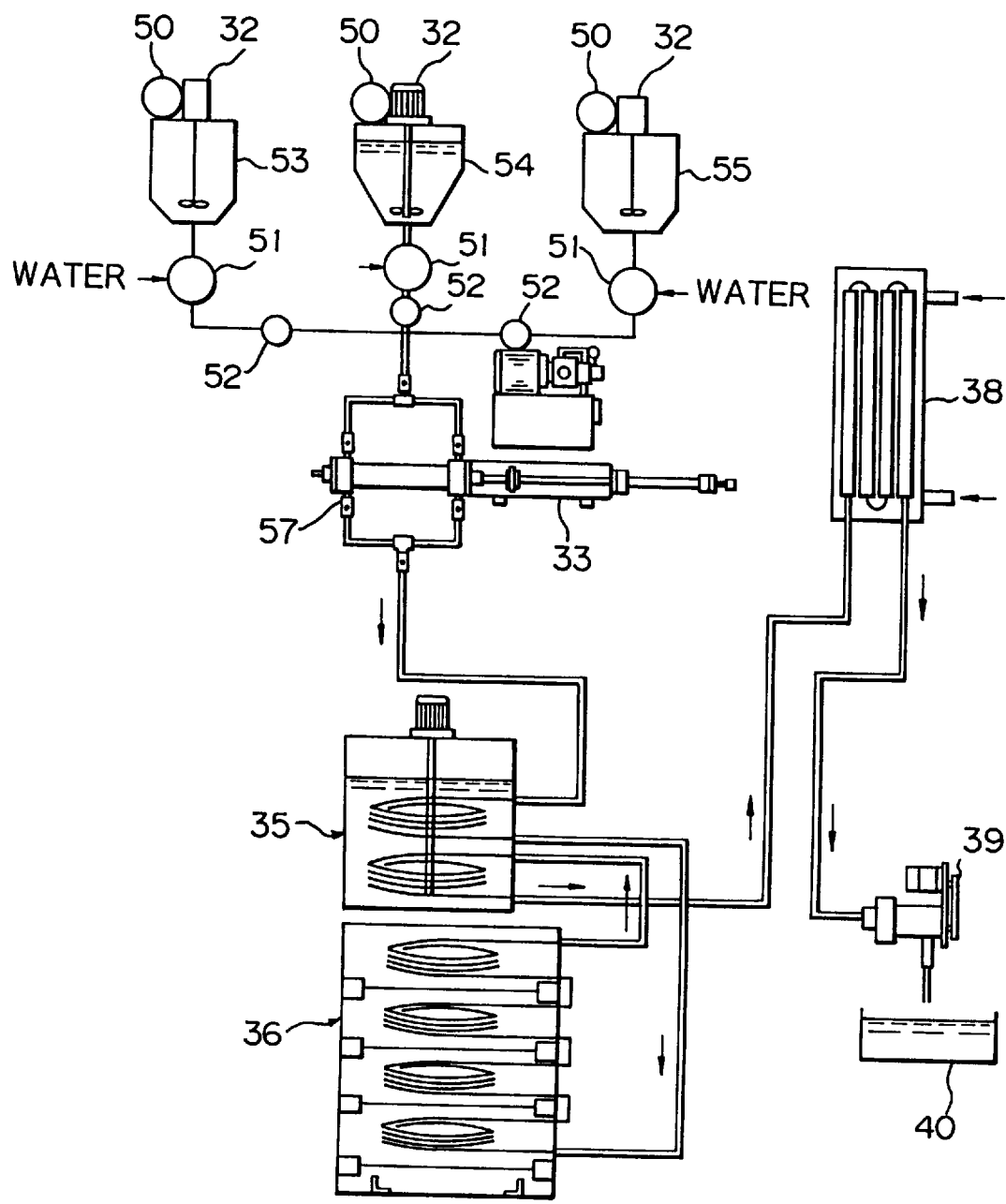
FIG. 5 is a diagrammatic view illustrating one example of the hydrothermal reaction apparatus similar to that of FIG. 4 in which a feed rate of each of the liquid to be treated, solvent and reaction accelerator may be adjusted by means of a single regulator valve.

Object material to be decomposed, water or hydrothermal solution (solvent) and reaction accelerator are supplied in to the tank 31. If necessary, the agitation means 32 is used so as to obtain a uniform mixture. Then, the mixture is injected into the reactors by means of the high-pressure injection pump 33. In the illustrated embodiment, the object material to be decomposed, aqueous solution and reaction accelerator are supplied from a single tank. It is noted, however, that, as shown in FIG. 4, separate tanks 53, 54 and 55 may be provided for each of the object material, water or hydrothermal solution (solvent) and reaction accelerator. In such a case, each tank is provided with a respective pump 56, 57 and 58. The displacement volume (flow rate) of each of the pumps 56, 57 and 58 may be changed so as to obtain any given maxing ratio. As shown in FIG. 5, each tank 53, 54, 55 may be provided at its outlet with a respective flow controller 52. The flow controller enables a flow rate therethrough to be controlled at a selected value. Thus, object material in a desired mixing ratio may be supplied by a single pump. Alternatively, any two of the object materials, aqueous solution and reaction accelerator, may be combined at a given mixing ratio and stored in one tank, and the remaining one is stored in another tank.

Figure 6:
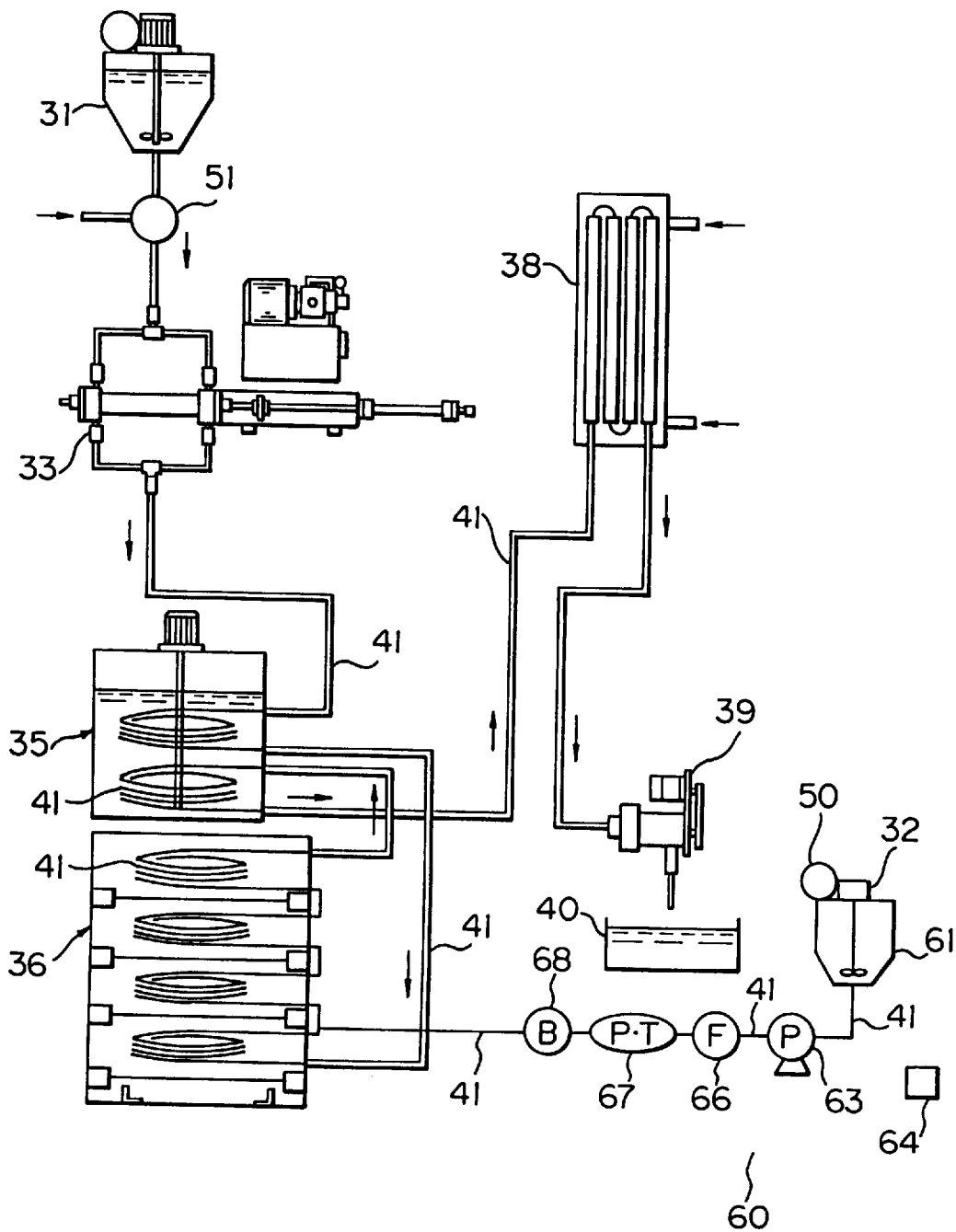
FIG. 6 is a diagrammatic view illustrating one example of the hydrothermal reaction apparatus similar to that shown in FIG. 4 in which reaction acceleration may be appropriately supplied to a reactor unit.

As shown in FIG. 6, it is possible for a quantity of a reaction controllers to be supplied into the reactor device 36 at its desired position through a check valve 68.

In the above reactor unit, the reactors are multi-staged in a vertical direction. It is noted, however, that the reactors may be multi-staged in a horizontal direction.

Figure 7:
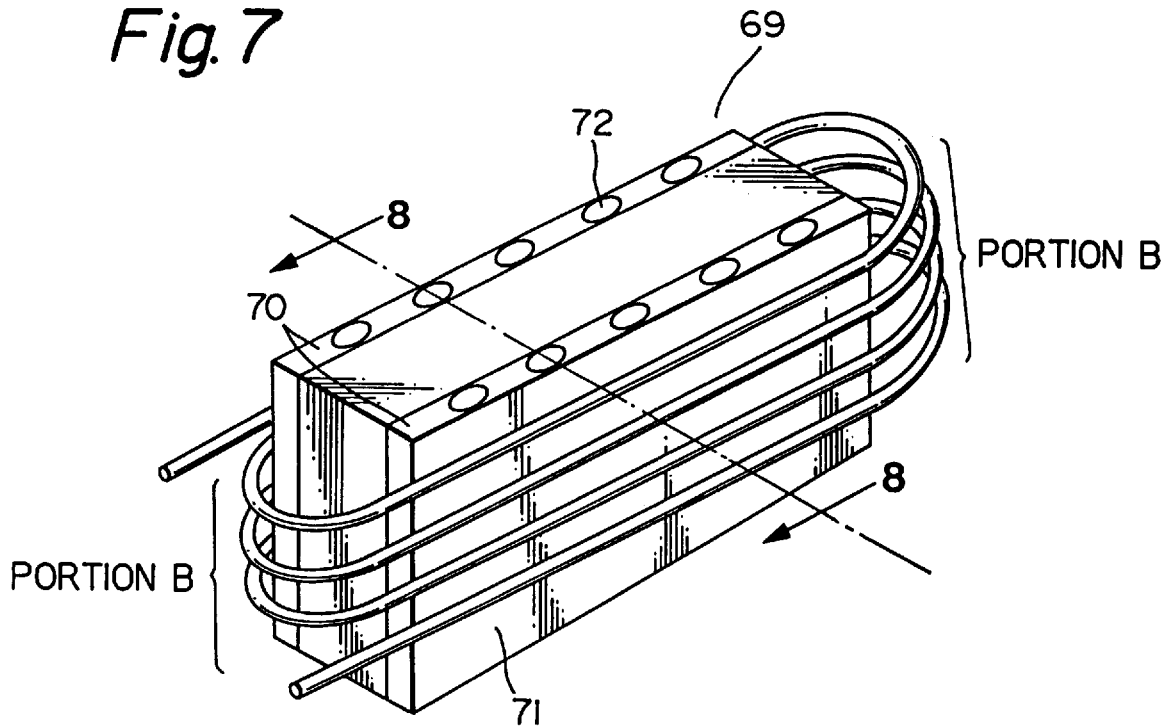
FIG. 7 is a perspective view illustrating one example of a curved or spiral piping to be incorporated into the reactor unit, as well as a heating unit.
Figure 8:
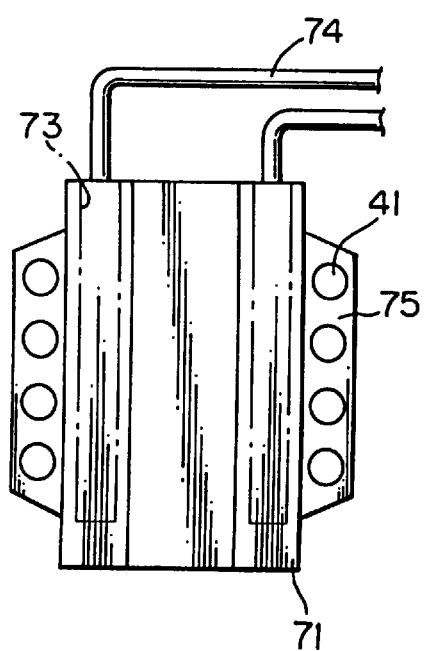
FIG. 8 is a cross-sectional view taken along line A—A of FIG. 7.
Figure 9:
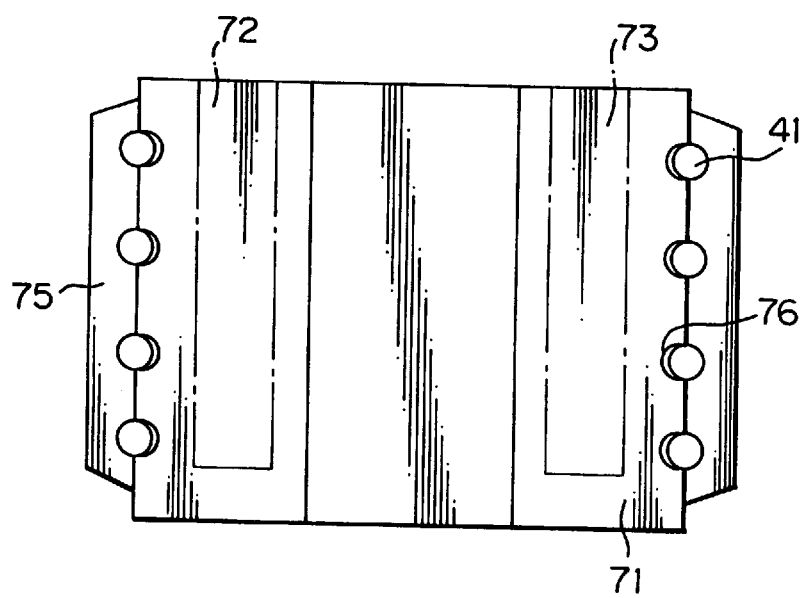
FIG. 9 is a cross-sectional view of a hot plate block of the heating unit provided with channels for piping.
Figure 10:
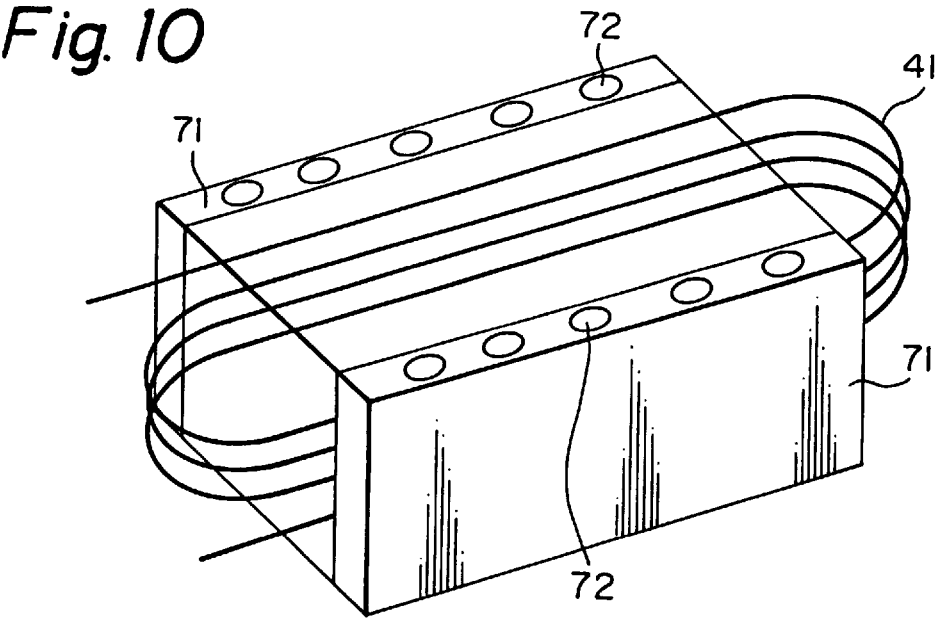
FIG. 10 is a perspective view similar to FIG. 7, illustrating curved piping accommodated within the hot plate block, and FIG. 10(*a*) is a top plan view illustrating one example of circular piping unified with a circular hot plate block.
Figure 10A:
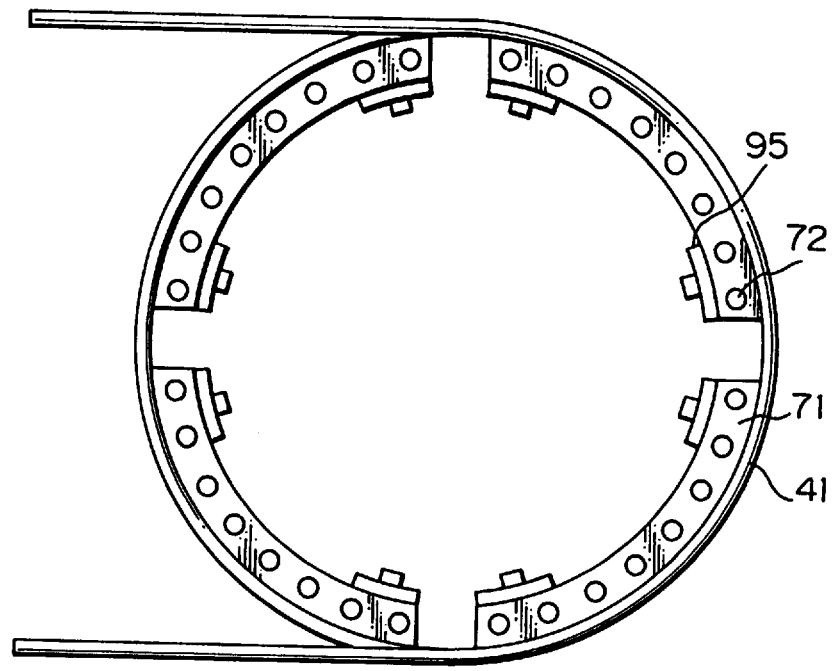
Figure 11:
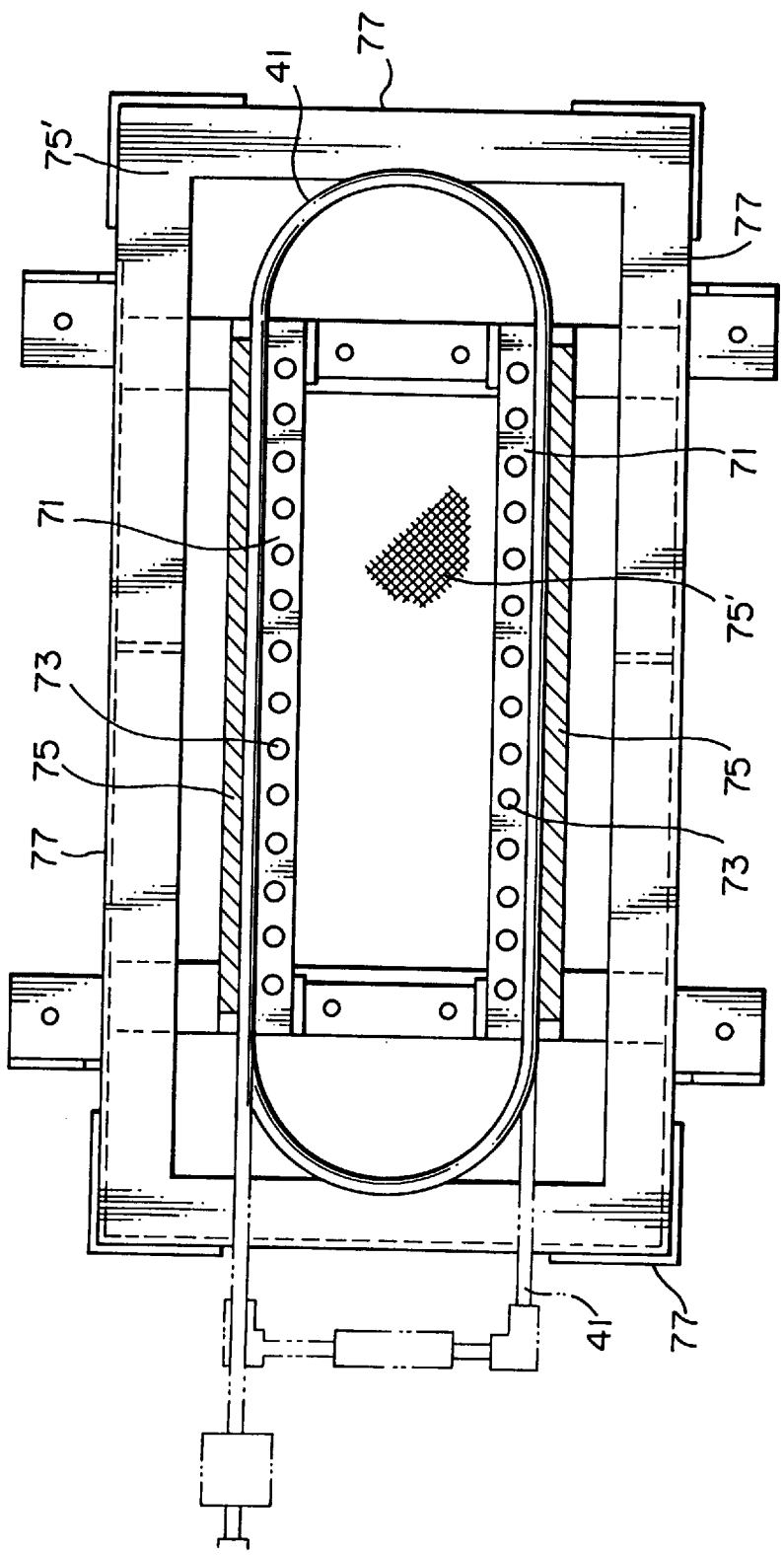
FIG. 11. is a top plan view, partly in section, of the reactor unit.

Each component will be explained below. The main portion (heating unit) 69 of the reactor unit 37 consists of a pair of heaters 70 of a plate-like configuration and a piping 41 of a spiral configuration, as shown in FIGS. 7–10. The heater 70 shown in FIG. 7 includes, as shown in FIG. 8, a hot plate block 71 of a heat conductive material. The hot plate block 71 is provided with a predetermined number of mount holes 72 for cartridge heaters 73. The cartridge heaters 73 are mounted in respective mount holes 72, thus constituting the heater 80. The hot plate block requires heat receptivity, high heat conductivity, easy workability and the like, and may be formed, for example, from SUH (heat resisting steel) or FCD (ductile iron). In the illustrated embodiment, the hot plate block is formed from FCD (ductile iron). The cartridge heaters 73 may be selected to have a desired heating value per a single cartridge heater. A required number of cartridge heaters are arranged in each of the hot plate blocks 71 so as to obtain appropriate heat transfer efficiency relative to the piping 41, as shown in FIG. 7. In FIG. 8, the outer surface of the piping 41 is covered with a layer of a heat conductive material, so as to increase heat efficiency. As shown in FIG. 9, the hot plate block 71 is provided in its side surface with a channel 76 for installation therein the piping 41. By this, the contact area between the hot plate block 71 and the piping 41 is increased, whereby higher heat conductivity may be obtained. As shown in FIG. 10, the curved piping 41 may be accommodated between the pair of hot plate blocks 71. In this case, each of the hot plate blocks may be provided in its inner surface with the channels shown in FIG. 9 for maintaining therein the piping 41. It is necessary for the reactor unit 37 to have a construction capable of absorbing thermal stress since it is heated to a high temperature. It is noted, however, that, according to the illustrated construction, stress due to the axial expansion of the piping may be easily absorbed by the curved portions (portions B) which are freely supported. The heating unit is constructed as a reactor unit 38 by filling heat insulating material 75' within the hot plate block, while covering the insulating material with a plate of stainless steel, and providing an inlet piping and an outlet piping as connection portions, as shown in FIG. 11. Rather than the curved piping 41 shown in FIG. 10, it is also possible to use a circular piping 41 shown in FIG. 10, it is also possible to use a circular piping 41 and arcuate hot plate blocks as shown in FIG. 10($a$). The circular piping 41 and the arcuate hot plate blocks are integrated by means of attachment fittings 95. A construction similar to that of the reactor unit 37 consisting of the curved piping 41 shown in FIGS. 10 and 11 may be applicable to the reactor unit consisting of the circular piping 41.

Figure 12:
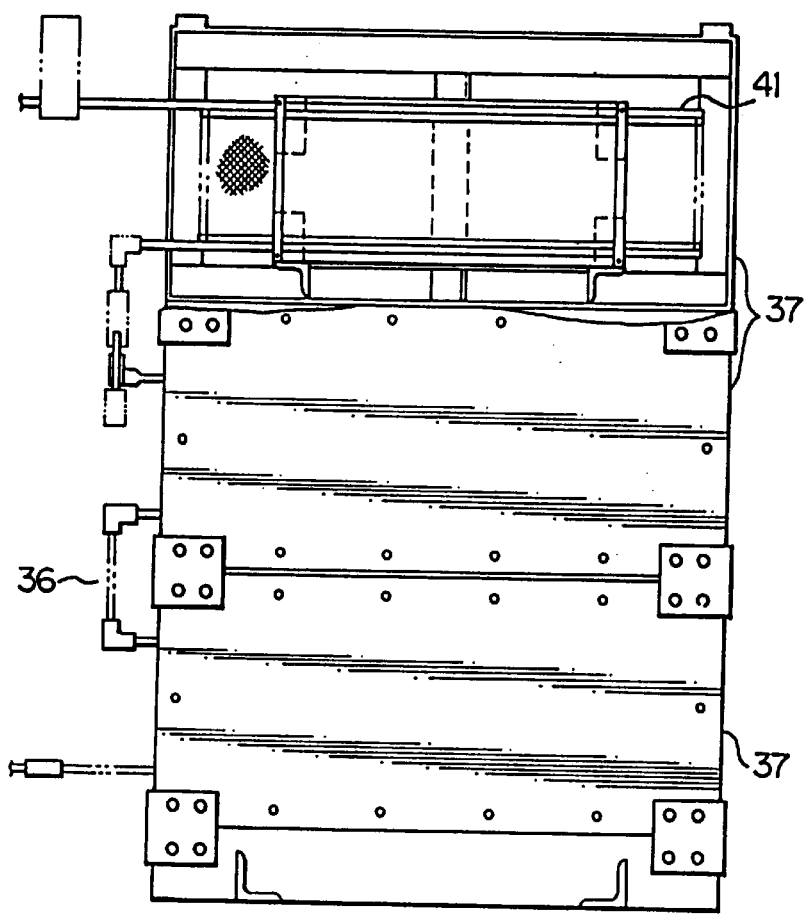
FIG. 12 is a side elevational view, partly in section, of a three-staged reactor unit.
Figure 12A:
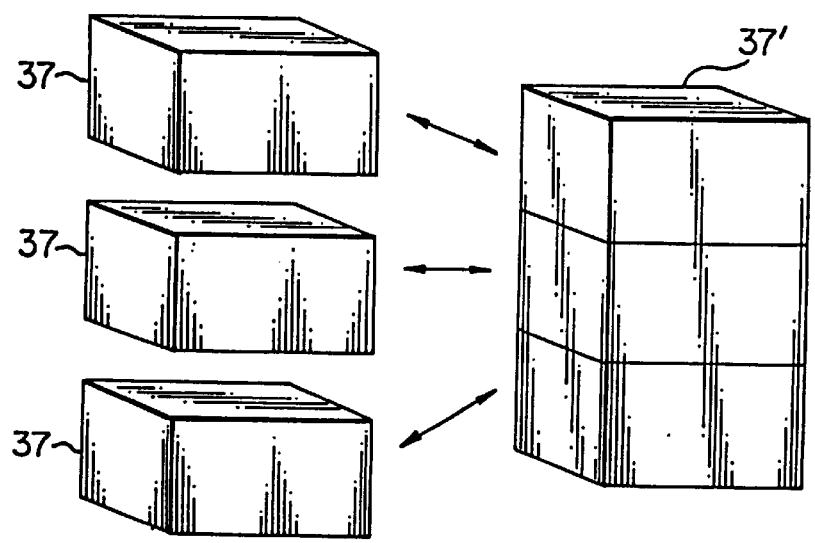
FIG. 12(a) is a diagrammatic view of a reactor units adapted to be accommodated in a cartridge fashion.

The reactor device 36 is constructed by connecting a required number of reactor units 37 in a multi-stage fashion, as shown in FIG. 12. The number of stages (three stages in the drawing) to be connected, or a size of units are determined depending upon a type of object material to be treated, and treatment capacity (flow rate), so that optimum reaction conditions, such as reaction time, heating time and temperature gradient may be obtained. For example, when the object material to be decomposed tends to be instantaneously treated or decomposed, it is unnecessary for all of the multi-stage reactor units 37 to be heated. Thus, only a required number of the reactor units are heated, and the cartridge heaters 73 for the remaining reactor units are not energized, so as to significantly improve heat efficiency and treatment cost. On the contrary, and when the object material is difficult to be decomposed or treated, only a required number of reactor units may be heated. While each of the reactor units 37 may be fixedly attached relative to one another by means of attachment fittings, it is also possible for each of the reactor units to be installed in a frame body 37' in a cartridge fashion, in order to remove a particular reactor unit(s) 37 for maintenance and replacement thereof.

The heat exchanger 35 is provided for performing pre-heating of a mixture of material to be decomposed, solvent and reaction accelerator (the mixutre will be referred to as "object liquid" hereinbelow) and for precooling treated liquid. The heat exchanger may be of any conventional construction. Similarly, the pump 33, the cooler 38 and the pressure reducing valve 39 may be of any conventional construction. The object material is sufficiently admixed with water or hydrothermal solvent (solvent), as well as reaction accelerator, if necessary, in the tank 31 by means of the agitation means 32. Thus, the obtained mixture is supplied by means of the high-pressure injection pump 33. The injected object liquid is preheated in the heat exchanger 35 and treated in the reactor device 36. The treated liquid is precooled by means of the heat exchanger 35 and de-pressurized by the pressure reducing valve 39. The treated liquid is then discharged into a tank 40 for treated liquid.

The reactor device 36, the heat exchanger 35 and the cooler 38 are connected relative to one another by means of pipings 41 the same as that of the reactor device 36. Thus, the formed flow passage line is constructed by the pipings 41 of the same diameter, so that highly reliable connetion may be easily obtained under high-temperature/high pressure condition.

Further efficient control for hydrothermal reaction may be obtained by changing the reaction temperature in each of the reactor units and/or by adding chemical controller (accelerator or inhibitor). FIG. 6 illustrates one example for embodying such condition. In FIG. 6, reference numerals 31 to 51 correspond to those shown in FIG. 3. In the illustrated embodiment, means 60 for injecting reaction inhibitor is interposed between the reactor units 37. The reaction inhibitor injection means 60 includes a reaction inhibitor tank 61, a piping 41, a high-pressure injection pump 63, a hydraulic unit 64, and a piping 41. A liquid level sensor 50 is mounted on the tank 61, so as to constantly monitor the volume of liquid in the tank 61. In the piping 41, a flow measurement device 66 for the reaction controller, a temperature/pressure measuring device 67, and a check valve 68 is provided. Flow rate of the reaction controller is detected by means of the flow measurement device 66 for the reaction controller or a rotary encoder 48 which measures displacement of the cylinder pump 63. The output signal relating the flow rate of the reaction controller is transmitted to the control computer and the control panel for indication thereof. The control computer automatically controls each portion to be maintained at a set condition. The reaction controller tank 61 is provided with a measurement device 50 for the treated liquid, so as to continuously monitor the volume of reaction controller in the tank 61. When the reaction controller is in a gaseous form, a gas cylinder is provided in place of the reaction controller tank 61. Various types of measurement devices, including an ultrasonic level sensor, may be used as the liquid level sensor or the measurement device 50. The flow rate, injection pressure and start/stop operation may be controlled by means of the control panel and the control computer.

Figure 13:
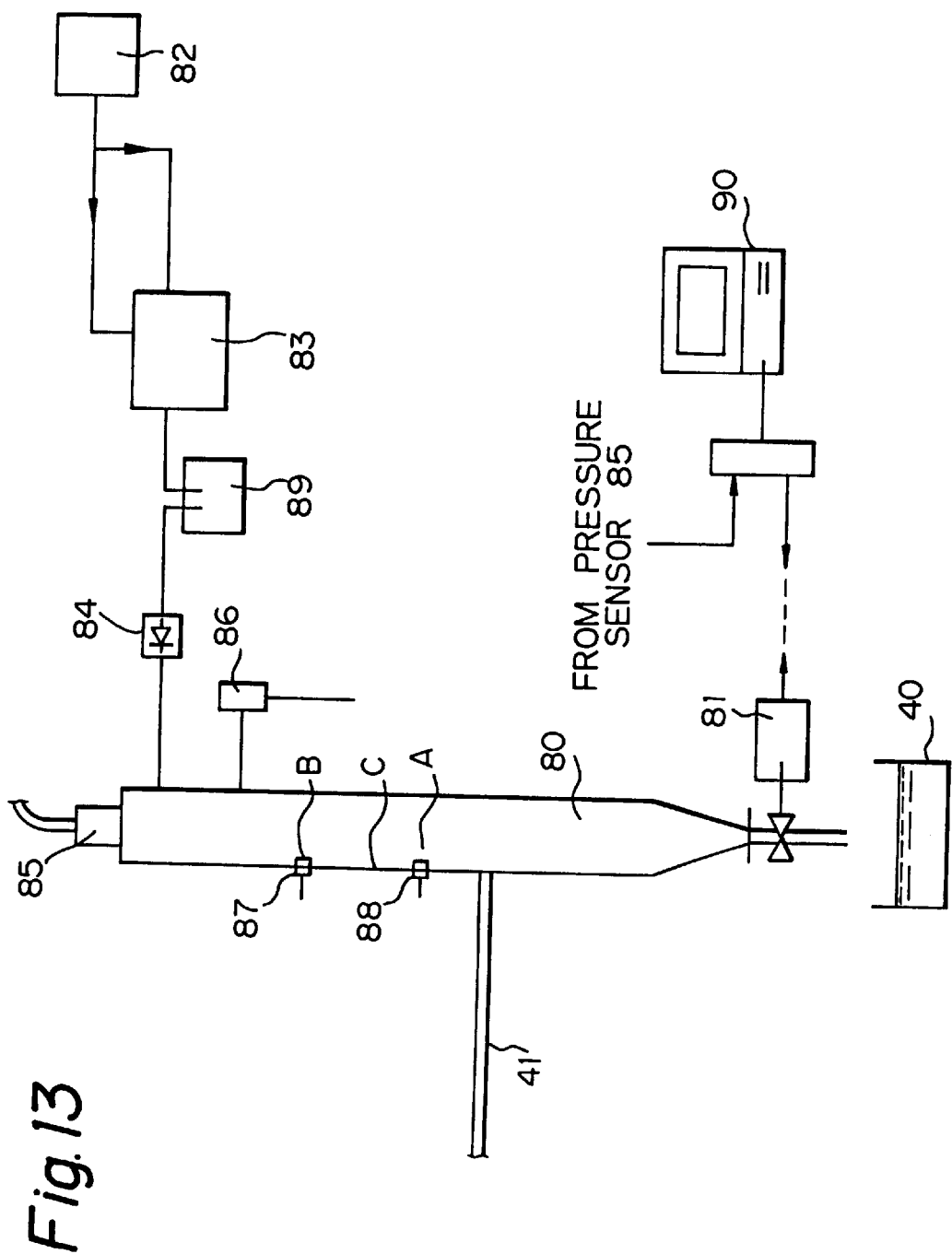
FIG. 13 is an explanatory view of one example of a reactor unit having one end to which a pressure regulation tank is connected.

A pressure reducing device for maintaining pressure in the flow passage line in a predetermined range will be explained below with reference to FIG. 13. Set values for each of the devices shown in FIG. 13 are as follows:

booster device 83:
discharge pressure; 400 kg/cm$^2$
discharge volume; 2.5 liters/min
air compressor 80:
discharge pressure; 7 kg/cm$^2$
pressure regulation tank 80:
pressure resistance; 400 kg/cm$^2$
pressure switch 84: 190 kg/cm$^2$
automatic open/close valve 81: adjusted to permit a flow rate of 1.0 liter/min. at the pressure of 200 kg/cm$^2$.

A flow of object liquid of 1 liter/min. at 200 kg/cm$^2$ is a shown from the reaction piping 41 into the pressure regulation tank 80. Assuming that the liquid level in the pressure regulation tank 80 is at point C, the in-flow volume and the discharge volume from the automatic open/close valve 81 are balanced. Thus, the pressure within the pressure regulation tank 80 is not fluctuated and maintained at a constant value.

In a freon decomposition apparatus, flow rate may be more or less fluctuated since a cylinder pump is used. It is noted, however, that such pressure fluctuation may be detected by means of a pressure sensor 85 mounted on the pressure regulation tank 80, so as to control the opening of the automatic open/close valve 81 by means of a control computer 90, whereby substantially no pressure fluctuation is caused. When freon is decomposed, sodium fluoride in powder form is created in the object liquid, so that the object liquid becomes solid/liquid mixture.

The opening of the automatic open/close valve 81 is adjusted so as to allow a discharge volume of 1 liter/min. at a pressure of 200 kg/cm². Since the open area is very small, that the powder tends to be collected in the discharge port, so as to significantly reduce the flow rate, whereby the liquid level is increased. When the pressure exceeds the set pressure of 210/kg/cm² of the safety valve 86, gas is automatically exhausted from the tank 80, so that the internal pressure within the tank is maintained at a value less than 210 kg/cm². At this time, the automatic open/close valve 81 is simultaneously controlled so as to obtain an increased opening, so that blockage in the discharge port is released when the opening reaches a predetermined value. Thus, liquid level is quickly decreased, so as to reduce the internal pressure within the tank. It is noted, however, that the pressure switch 84 is automatically actuated when the pressure within the tank is reduced to a value less than 200 kg/cm², so that a flow of air at 400 kg/cm² contained in an air tank 89 is supplied to the tank, whereby the pressure within the pressure regulation tank 80 is maintained at a value less than 190 kg/cm². Simultaneously therewith, the automatic open/close valve 81 is controlled by means of the control computer 90 to be closed quickly so as to be returned to its original opening. When the liquid level is lower than the position of a LOW liquid level sensor 88, the automatic open/close valve 81 is further closed slightly. When the liquid level is increased beyond the position A, the automatic open/close valve 81 is returned to its ordinary position. If the liquid level exceeds the position of a HIGH liquid level sensor 87, the automatic open/close valve 81 is slightly opened so as to cause the liquid level to be decreased. When the liquid level decreases to a level beyond the position B, the automatic open/close valve 81 is returned to its ordinary position. The above procedures are repeated so as to maintain the pressure within the pressure regulation tank 80 at a pressure of 190–210 kg/cm².

When the object liquid contains a quantity of gas, the pressure within the pressure regulation tank 80 increases gradually. The gas is exhausted out of the tank 80 through the safety valve 86, when the pressure within the tank 80 exceeds 210 kg/cm². When a particular gas is considered to be dangerous, nitrogen gas may be used as inlet gas to the booster device 83. The pressure switch 84 is automatically actuated, when the pressure within the pressure regulation tank 80 is decreased below a set pressure value (200 kg/cm² with regard to freon decomposition), so as to cause air at 400 kg/cm² contained in an air tank 89 to be supplied into the pressure regulation tank, in order to maintain the pressure within the tank at a constant pressure. At this time, quicker response may be expected when the gas pressure (400 kg/cm², in this case) within the air tank 89 is higher than the set pressure value. It is also noted that larger tank capacity provides an increased amount of supplemental air, so that safety property is increased. Larger volume of the pressure regulation tank 80 decreases fluctuation of the pressure within the pressure regulation tank 80 due to the change in opening of the automatic open/close valve 81. Thus, on/off-control for opening of the automatic open/close valve 81 may be performed, when the pressure regulation tank 80 has a larger volume.

As will be appreciated from the foregoing, continuous and safety operation, with substantially no pressure fluctuation as experienced in prior art, may be performed in accordance with the invention, while obviating occurrence of abnormal pressure due to blockage in the automatic open/close valve 81 and gas generation in relation to the treatment reaction.

Figure 15:
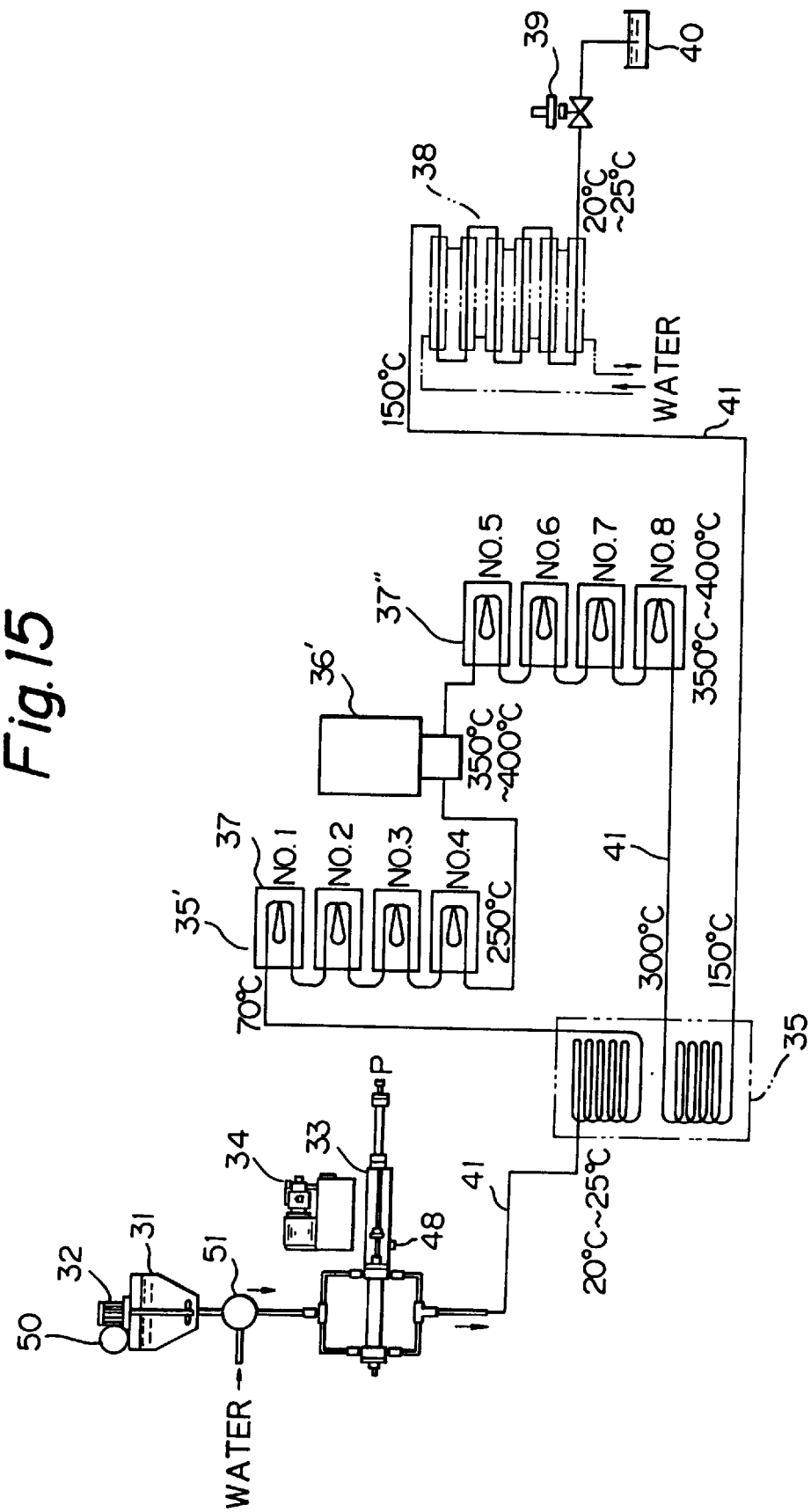
FIG. 15 is a diagrammatic view of one example in which an induction heater is used as a pre-heater.

A further embodiment is illustrated in FIG. 15. Reference numeral 31 denotes a tank with an agitation means 32 for receiving a quantity of object liquid (object material to be decomposed+solvent+reaction controller), 33 a high-pressure injection pump, 34 a hydraulic unit, 35 a heat exchanger, 35' a preheater including multi-staged (4 stages in the drawing) reactor units 37, 36' an induction heater 37" capable of instanteously increasing the temperature of the solvent to a target value by heating the piping by means of induction heating, 38 a cooler, 39 a pressure reducing valve, and 40 a tank for receving a quantity of treated liquid. Of course, the preheater 35' may be used as a reaction device or reactor device 36.

When it is desired to instantaneously increase the temperature of the solvent containing the object material to be treated to a target value, the induction heater 36' may be used. In the induction heating, quick heating at a rate of 100° C./min. or more is possible, by means of magnetic hysteresis loss and eddy current. By employing induction heating, it is possible for the solvent to be instantaneously heated to about 200° C. or more by heating the piping of a length of merely one meter by means of the induction heater. The induction heating is advantageous since it is possible to instantaneously obtain a set temperature (target temperature) and to easily control the reaction phenomenon. Since the thermal time constant is extremely small, temperature control may be easily performed. The construction may be significantly simplified. Since the solvent within the piping may be instantaneously heated to a target value, less length of the piping is required to be heated.

Figure 16:
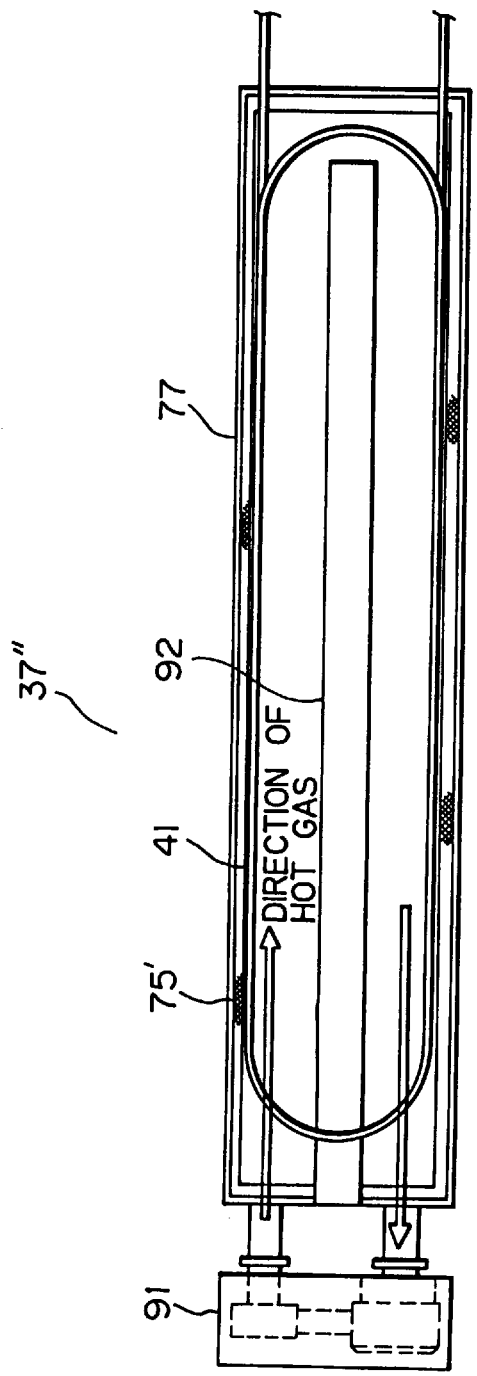
FIG. 16 is a schematic view illustrating one example of a warmer using hot gas.

When it is desired to set the reaction temperature for example at 400° C., the object liquid is heated to about 250° C. by means of the preheater 35'. Then, the object liquid is instantaneously heated to a set temperature value by means of the induction heater 36'. Thereafter, the object liquid is maintained at the set temperature value for a predetermined period of reaction time. Thus, a predetermined reaction temperature may be maintained for a predetermined period of reaction time substantially by means of simple thermal insulation (slight heating is required). In order to perform thermal insulation, a construction similar to that of the reactor unit 37 may be employed. It is noted, however, that the thermal insulation/heating system in which air is circulated using a hot gas generator as shown in FIG. 16 may be used, instead of the construction similar to that of the reactor unit 37. A warmer 37" may be constructed by a hot gas generator 91, insulating material 75', and partition plate 92. The insulating material 75' and the partition plate 92 are enclosed, for example, by a plate 77 of stainless steel. The warmer 37" is a very simple construction, so that maintenance work such as replacement of parts may be easily performed. It is also noted that temperature control may be easily performed since the thermal time constant is small. Usually air is used as hot gas. It is noted, however, that any gas other than air which is superior in terms of specific heat and heat conductivity may be used. The preheater may be eliminated depending upon a reaction temperature and a design condition of the induction heater. Quick heating means 36' is capable of momentary heating of the reaction fluid. The reaction can be controlled by changing the rate of temperature elevation by the quick heating means. Take, for example, the case of treating a polyethylene resin with the hydrothermal reaction apparatus of the invention. It is decomposed into an oil content of varying proportions of paraffinic and olefinic hydrocarbons. The proportions of the paraffinic and olefinic hydrocarbons to be produced can be controlled by adjusting the reaction time, reaction temperature and the rate of temperature elevation. If the reaction time is increased or the rate of temperature elevation is reduced, more of the paraffinic hydrocarbons will be produced. Conversely, if the reaction time is shortened or the rate of temperature elevation is very fast, the production of olefinic hydrocarbons will increase.

An embodiment for maintenance (compensation) of the pressure using a cylinder pump as the high-pressure pump will be explained below. It is true that a cylinder pump may be used as the high-pressure injection pump 33, the cylinder pump temporarily produces a decreased pressure when the cylinder is returned at opposite ends. For example, depending upon a given displacement velocity of the cylinder, the output pressure or discharge pressure of 200 kg/cm$^2$ from the cylinder pump may be reduced by the amount of 5 kg/cm$^2$ to 100 kg/cm$^2$, when the cylinder pump is returned at the opposite ends.

Figure 17:
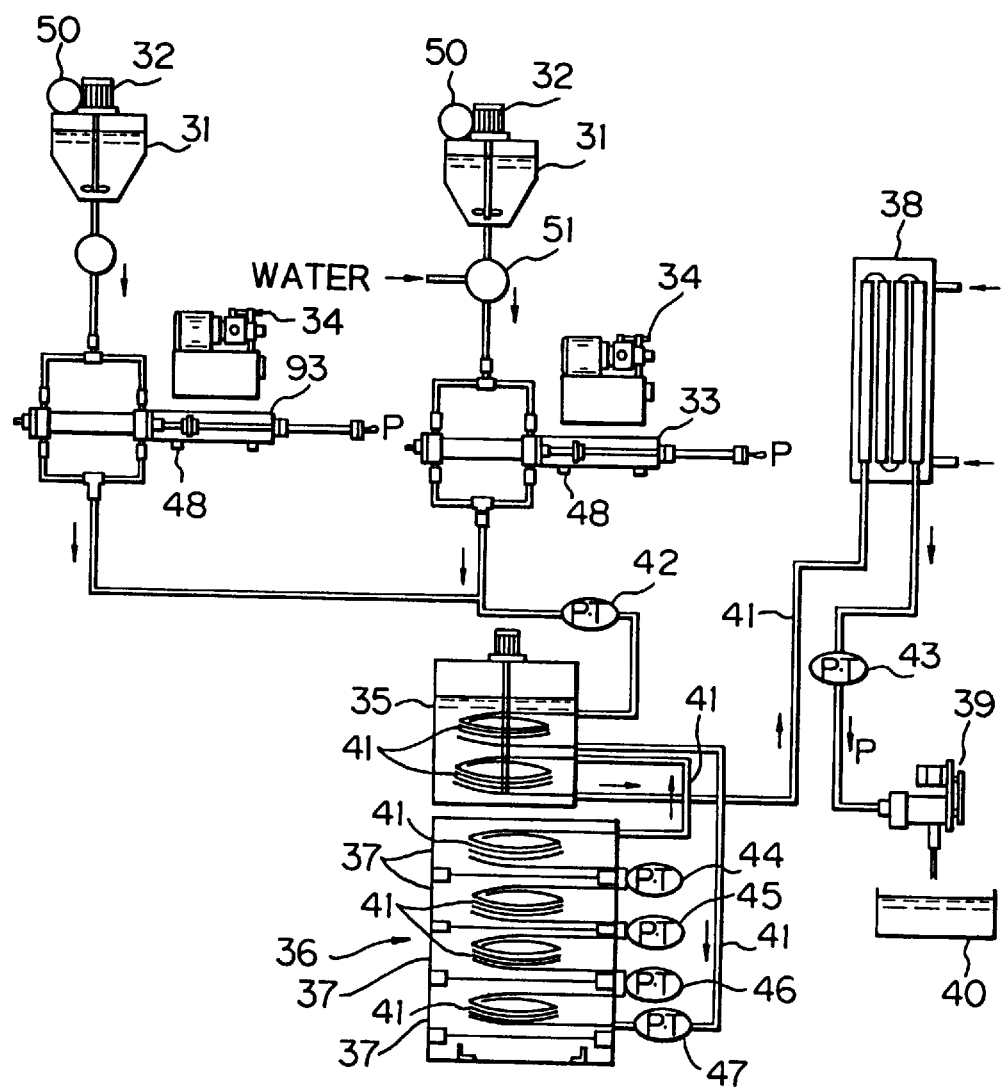
FIG. 17 is a diagrammatic view illustrating another embodiment of the invention employing pressure compensation means.

The pressure decrease caused when the cylinder is returned at the end may be prevented by injecting a quantity of object liquid by means of a pressure compensation means 94. FIG. 17 is an illustrative view showing another embodiment of a pressure compensation system of the invention. The high-pressure injection pump 33 is adapted to have a constant displacement speed regardless of a given pressure, so as to supply a constant volume of object liquid into the piping. A compensation pump 93 for injecting a quantity of object liquid is actuated when the pressure within the piping is decreased below a set value, for the purpose of compensation of the decreased pressure. Thus, the compensation pump is not actuated when the cylinder of the high-pressure injection pump 33 is not at the opposite ends.

Assuming that the displacement speed of the cylinder of the high-pressure injection pump 33 and the opening of the pressure reducing valve are adjusted, so as to permit a flow of object liquid at 1.0 liter/min. under the pressure of 200 kg/cm$^2$.

When the cylinder of the high-pressure pump 33 is returned at one end, the pressure within the piping is decreased. The decrease in pressure is detected by the pressure sensor 42. If it is intended to prevent such pressure decrease by reducing the opening of the pressure reducing valve 39, appropriate adjustment for the opening of the pressure reducing valve 39 could not be performed, since such pressure decrease in the piping is caused instantaneously. Rather, the opening is excessively decreased, so as to quickly increase the pressure, thus disadvantageously causing the pressure to be fluctuated to a substantial degree.

On the contrary, when the pressure compensation pump 93 is actuated simultaneously with the detection of a pressure decrease by means of the pressure sensor 42, so as to supply a quantity of object liquid corresponding to the pressure decrease, no pressure fluctuation is caused at either end of the pump.

Thus, it is possible to perform a stable hydrothermal reaction without pressure fluctuation, when the cylinder of the pressure compensation pump 93 is actuated simultaneously with the detection of pressure decrease at the opposite ends of the cylinder pump by means of the pressure sensor 42, for the purpose of compensation of the pressure decrease.

The reaction piping of the hydrothermal reaction apparatus may be of a double-tube construction including an inner tube and an outer tube, in order to prevent the content within the piping from being exhausted when the reaction piping is damaged. It is noted, however, that, with such a simple double-tube construction, the thermal time constant of the reactor portion becomes significantly larger, so that the temperature of the reaction portion will be increased. Thus, a quantity of water is supplied into a space between the outer and inner tubes of the double-tube construction by means of a high-pressure pump, simultaneously with detection of pressure decrease, for example, due to the damage of the reaction piping. By this, it is possible for the temperature of the reaction device to be decreased, as well as preventing leakage of the object material to be decomposed within the reaction piping. The extent of the flow passage over which the double-tube construction is provided may be selectively determined depending upon certain condition, such as the construction of the apparatus and the type of the object material to be decomposed.

An example for decomposing freon by means of the hydrothermal reaction apparatus of the invention will be explained with reference to FIG. 3.

The piping 41 of the reactor unit 37 is constituted by a stainless (SUS 316) pipe having an inner diameter of 6 mm and an outer diameter of 10 mm. The stainless pipe is wound into a spiral configuration to form four stages of spiral pipings. A cylinder pump is used as the high-pressure injection pump 33.

A 350 gram of a specified freon (CFC113), a 36 liters of 4 M (4 normal) sodium hydroxide aqueous solution as a solvent, and a 36 liters of methanol as a reaction accelerator were contained in the object liquid tank 31 and admixed therein. The flow rate was set at 1 liter/min. and the Reynold's number was 7,080 which is three times larger than the minimum Reynold's criterion, thus creating a significantly turbulent region.

A quantity of water is supplied into the high-pressure injection pump 33 through a flow passage change-over valve 51. Thus, water is supplied into the reaction device 36 through the heat exchanger 35 at the rate of 1 liter/min. under 200 kg/cm$^2$. The flow rate was controlled by means of the opening of the pressure reducing valve 39, and the pressure was remotely controlled by regulating the output pressure from the high-pressure injection pump 33 through the control panel and the control computer. Then, the temperature of each of the reactor units 37 of the reaction device 36 was set at a predetermined value. After confirming that each of the units 38 reached the predetermined value, the passage change-over valve 51 was changed to be connected with the passage from the tank 31. The object liquid was supplied in a manner similar to that mentioned above. The fluid containing the object material to be decomposed (object liquid) passes through the reaction device 36 within a short time of about two minutes or less. The object liquid then passed through the heat exchanger 35 and the cooler 38. The object liquid was reduced in its pressure by the reducing valve 39 and discharged into the tank 40 for receiving treated liquid. When freon is decomposed under the above condition, sodium fluoride is produced as a decomposed by-product. Such sodium fluoride has low solubility in an alkaline/methanol solution, so that it is precipitated as powder. When decomposition is performed under a turbulent condition, efficient decomposition reaction is obtained. Furthermore, the fluid and the sodium fluoride flow to the pressure reducing valve 39 in a completely uniformly-admixed manner, so that there is no risk of causing blockage in the piping 41. On the contrary, if the decomposition reaction is proceeded under a laminar flow condition, rather than the turbulent flow condition, the resultant sodium fluoride, together with the fluid, would be passing through to the pressure reducing valve in an insufficiently admixed manner. Thus, it is likely to cause a problem of blockage within the piping 41. It is also expected that an agglomerate of sodium fluoride passing through the pressure reducing valve could also cause blockage of the pressure reducing valve 39.

Figure 14:
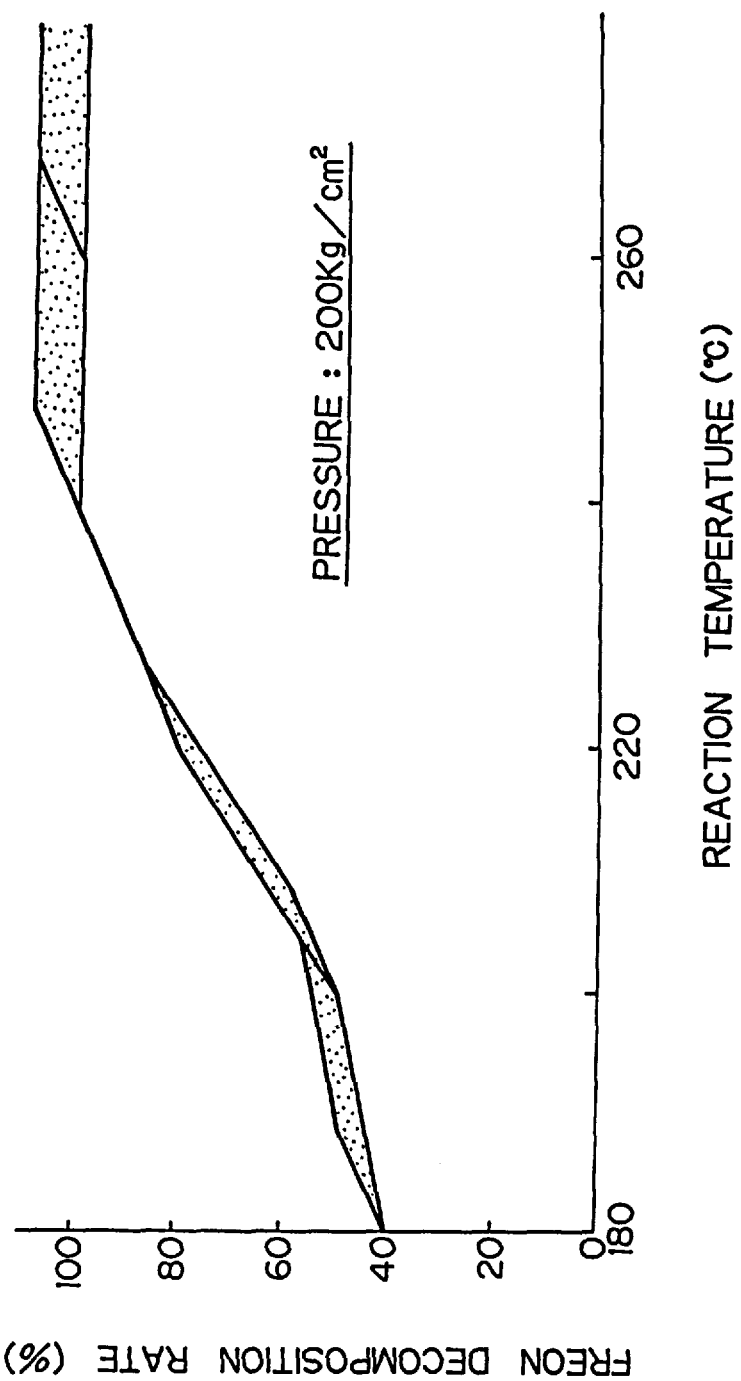
FIG. 14 is a graph showing one experimental result obtained when freon is decomposed in accordance with the present invention.

An analytical result is shown in FIG. 14. Decomposition of freon is possible with regard to the reaction time of less than 2 minutes and the reaction temperature of less than 200° C. In such a case, more than 99.99% of the freon is decomposed. When the pressure is increased, the decomposition reaction is facilitated. This means that more complete decomposition reaction may be expected at the reaction temperature of 200° C., when increased stages of reactor units 37 are used in order to increase the reaction time or the object liquid is returned to the reaction device.

Figure 18:
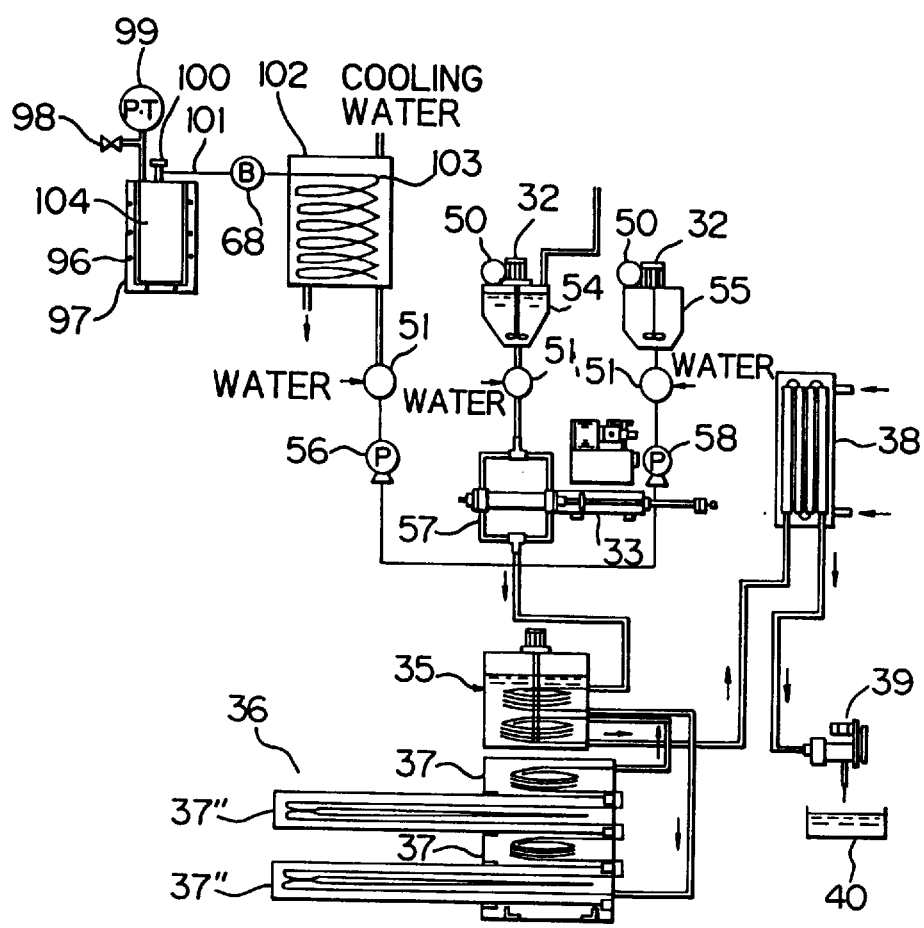
FIG. 18 is a diagrammatic view illustrating a reaction system for complete decomposition of undecomposed material according to the invention.

When the material such as freon 12 ($CCl_2F_2$), which is in a gaseous form under ordinary temperature and pressure but may be liquefied by decreasing pressure and temperature, is to be treated, a gas cylinder 104 containing freon therein, as shown in FIG. 18, may be used. The gas cylinder 104 includes a safety valve 98, a temperature/pressure sensor 99, and a stop valve 100. The gas cylinder 104 is heated by means of a heater 97 having a heating means 96, so as to increase the internal pressure of the gas cylinder. Then, the freon flows from the gas cylinder through a conduit 101 into a cooling device 102 including a piping 103. This piping is wound into a spiral configuration for the purpose of increasing cooling efficiency thereof. The freon having being transferred into the cooling device 102, is liquefied so that it may be further transferred by means of a conventional pump.

A recycle system which may be used when the object material is not treated to a target value or quality, or when hydrothermal solution (solvent) is recycled in order to reduce in volume of waste liquid.

When the object material may be decomposed with inexpensive hydrothermal solution (solvent), treatment costs are not of a particular concern. On the contrary, and if expensive hydrothermal solution (solvent) is required, it is desirable to recover and to recycle the hydrothermal solution (solvent). When the object material has not been treated to a target value through a single treatment process, it is necessary for such decomposed object material.

In order to facilitate stable decomposition of the object material, a required number of reactor units 37 or warmers 37", for example, may be added. It is noted, however, that this may cause problems relating to the installation cost and installation space.

Thus, it is desirable for the undecomposed object material remaining in the treated liquid to be again subjected to hydrothermal processing, while, at the same time, recycling the hydrothermal solution (solvent). This advantageously contributes to the reduction in the cost of hydrothermal solution and installation space, as well as to stable treatment of the object material. The undecomposed object material and the hydrothermal solution (solvent), not separated from one another and admixed together, may be returned or recycled to the hydrothermal reaction apparatus 36.

Figure 19:
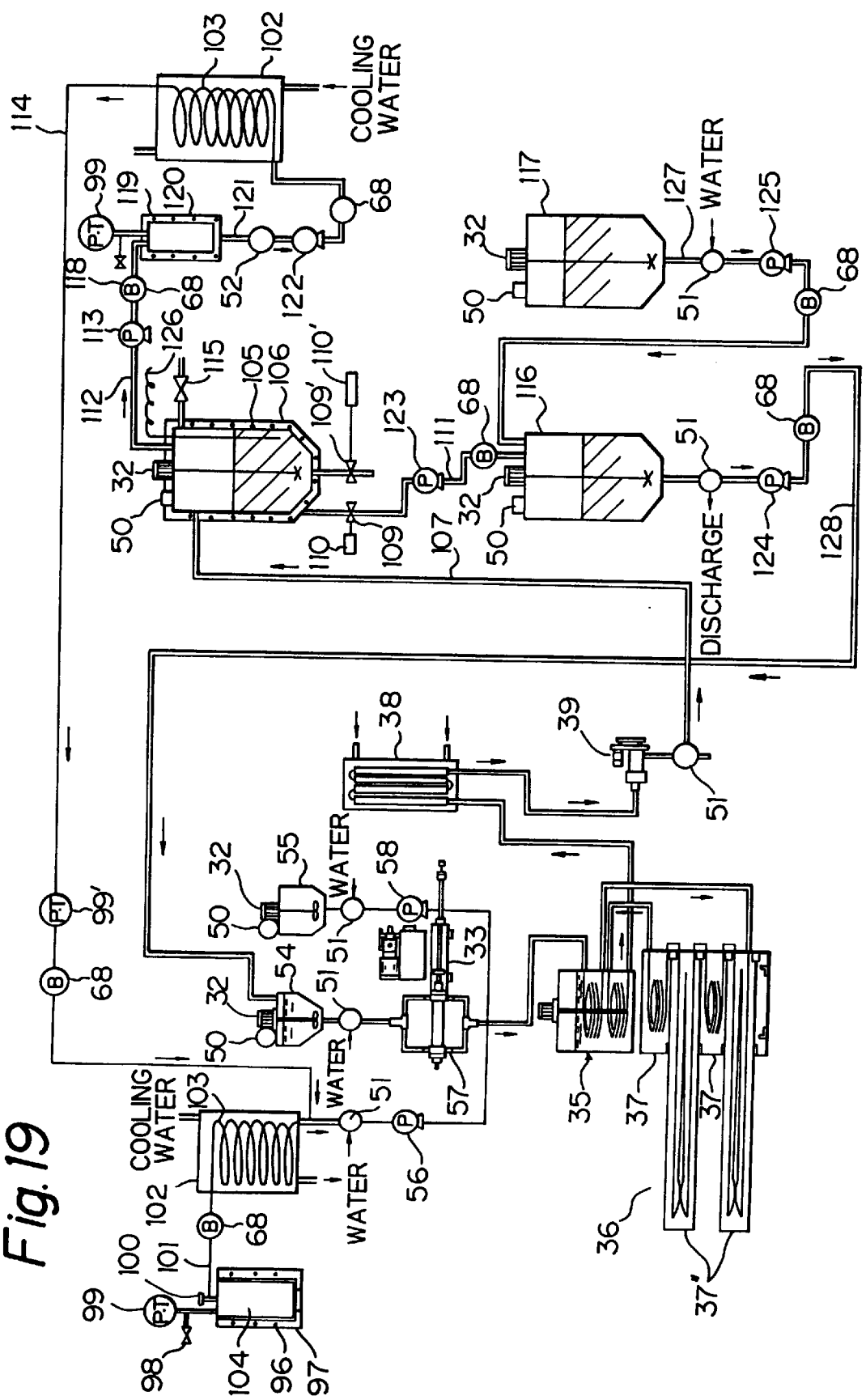
FIG. 19 is a diagrammatic view illustrating a reaction system in which undecomposed material is recycled for complete decomposition thereof.

FIG. 19 illustrates a recycling treatment system in which undecomposed object material such as freon 12, which is in a gas form under ordinary temperature and pressure, may be liquefied by decreasing the pressure or temperature.

Reaction in which freon 12 is decomposed using merely a solution of sodium hydroxide (NaOH) as a hydrothermal solution can be generically expressed by the following equation (actually, decomposition is performed under the presence of excessive concentration of sodium hydroxide, since such reaction is facilitated under higher concentration of sodium hydroxide.

$CCl_2F_2 + 2H_2 + 5NaOH \rightarrow NaHCO_3 + 2NaF + 2NaCl + 4H_2O$

Thus, unreacted sodium hydroxide solution remaining in the treated liquid may be reused. If freon 12 is contained in the treated liquid as undecomposed object material, it may be recovered and re-treated, so as to obtain reliable decomposition and reduction of treatment cost.

Treated liquid containing undecomposed object material (freon 12) is discharged through the pressure reducing valve 39 via conduit 107 into a tank 106 for receiving the treated liquid. The tank 106 is provided with a heating means 105 and a temperature sensor 126. In the tank 106, the hydrothermal solution (solvent) is collected in the bottom tank, while freon 12 is collected in the upper portion of the tank. The liquid volume in the tank 106 is monitored by the liquid level sensor 50. The liquid level sensor 50 is automatically controlled by means of the control computer. The liquid level sensor 50 monitors the liquid level in the tank and control an automatic open/close valve 109 in order to keep a predetermined volume of treated liquid. When freon 12 is contained in the hydrothermal solution (solvent), the treated liquid is heated by means of a heating means 105, so as to cause freon 12 in the hydrothermal solution (solvent) to be evaporated in the gas phase, whereby the hydrothermal solution (solvent) and freon 12 are completely separated. Thus, the separated freon 12 is discharged through an exhaust conduit 112 and injected by a pressurized pump 113 into a gas cylinder 120 having a heating means 119. The freon 12 in the gas cylinder 120 is heated by means of the heating means 119 whereby internal pressure of the gas cylinder is increased. Then, the freon 12 is transferred through a conduit 121 by means of a pump 122 and into a cooling device 102, whereby the freon 12 is liquefied. The cooling device 102 includes a conduit 103 wound in a spiral configuration for increasing cooling efficiency thereof. The liquefied freon 12 is recycled to the hydrothermal reaction apparatus through a conduit 114.

The hydrothermal solution (solvent) in the treated liquid is discharged through the automatic open/close valve 109 controlled by the control computer 110 via a conduit 111 into a tank 116 for controlling concentration of the hydrothermal solution (solvent). The treated liquid in the tank 116 has been reduced in it alkali concentration due to the decomposition of freon 12. Thus, when the treated liquid is used as the hydrothermal solution (solvent), alkaline concentration of the treated liquid in the tank 116 is measured. If the concentration is low, a quantity of alkaline solution of a high concentration in the tank 117 is supplied through a conduit 127 by means of a pump 125 into the tank 116. Thus, the concentration controlled treated liquid may be recycled through a conduit 128 as hydrothermal solution (solvent). As the result of decomposition of freon, sodium fluoride is generated to be collected in the bottom of the tank 106. An automatic slurry discharge valve 109' is actuated for a predetermined period of time by means of a control computer 110', so as to discharge the collected sodium fluoride out of the tank 106.

The tank 106 may be heated, without using the heating means 105, by recycling a portion of the treated liquid having been transferred through the heat exchanger 34 and precooled into the tank 106.

In FIG. 19, the freon 12, having been separated from the hydrothermal solution in the tank 106, is liquefied in the cooling device 102 downstream of the gas cylinder 120. The freon 12 passes through the temperature/pressure sensor 99' and the check valve 68, and recycled by means of the pump 51. In this regard, it is possible to eliminate the cooling device 102 downstream of the gas cylinder 120. In such a case, the freon 12 may be cooled by means of the liquefying device 102 having the cooling conduit 101. The recycled freon 12 may be combined with freon gas from the conduit 102 at a point just before the cooling device 102, so as to be liquefied and treated.

Figure 20:
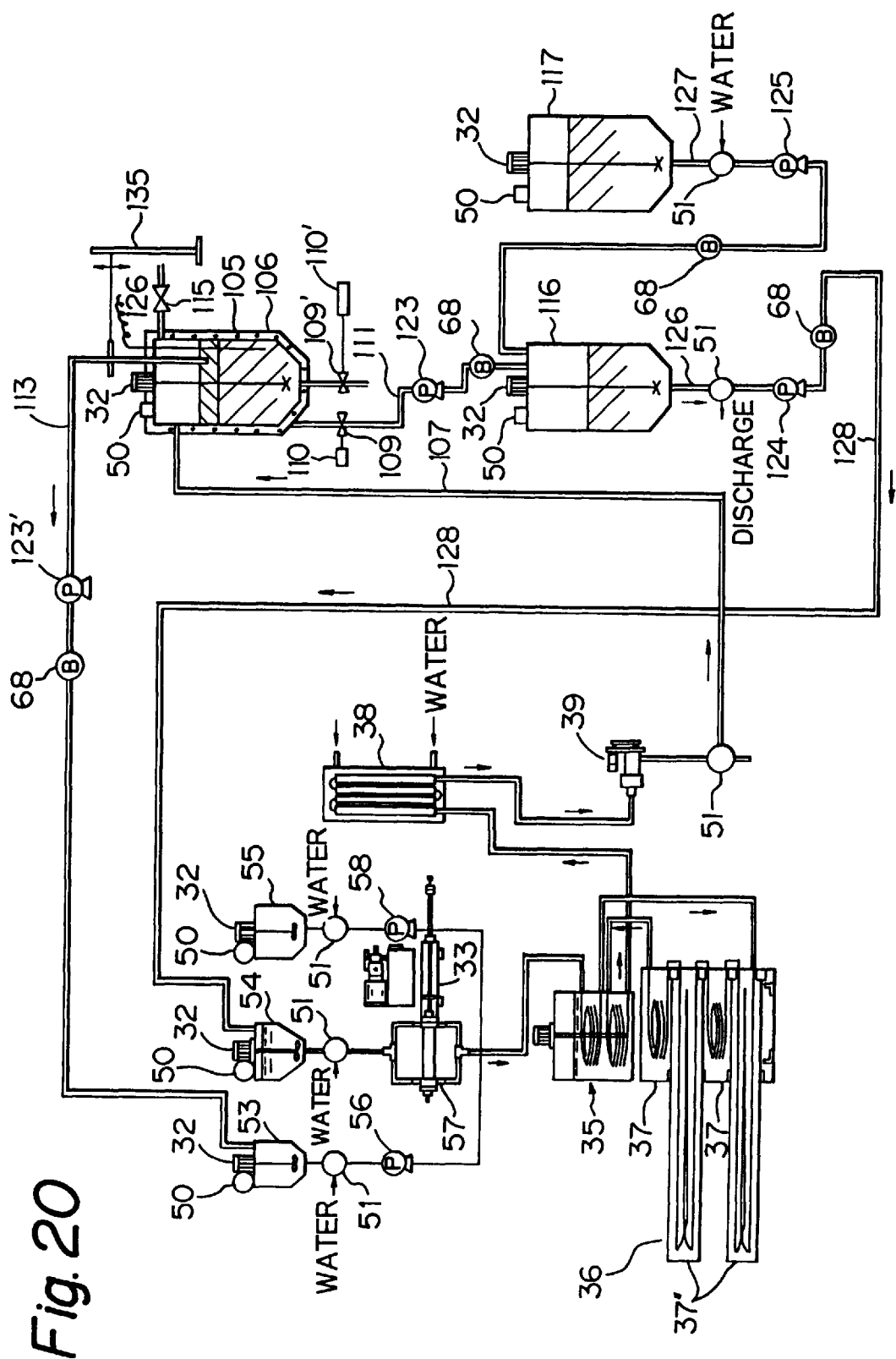
FIG. 20 is a diagrammatic view illustrating another embodiment of the invention.
Figure 21:
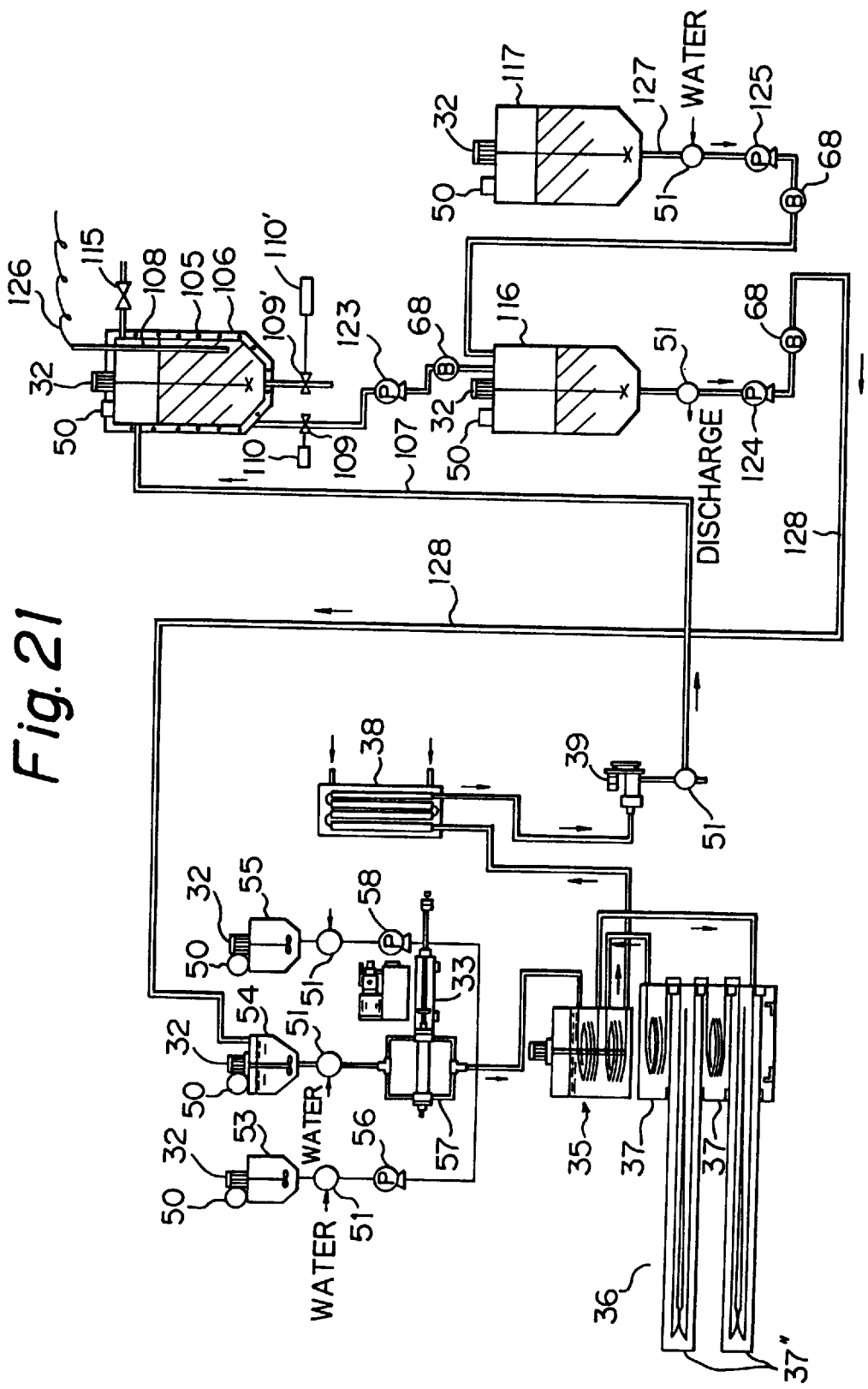
FIG. 21 is a diagrammatic view illustrating still another embodiment of the invention.

When the undecomposed object material has a specific gravity less than the hydrothermal solution (solvent) and is insoluble to the hydrothermal solution (solvent), the undecomposed object material is discharged from the tank 106 through a conduit 113, as shown in FIG. 20 which illustrates variation of FIG. 19. Adjustment of the distance between the end surface of the conduit 113 and the liquid surface in the tank 106 may be performed as follows. In this regard, it should be noted that the hydrothermal solution (solvent) does not present significant change in volume. Thus, liquid level of the hydrothermal solution (solvent) in the tank 106 may be calculated from the feed volume of the hydrothermal solution (solvent). The opening of the automatic open/close valve 109 of the tank 106 is monitored and automatically measured. The liquid level of the hydrothermal solution (solvent) in tank 106 is checked by means of the liquid level sensor 50. The liquid above the liquid level is discharged from the tank 106. In this manner, the undecomposed object material may be reliably separated.

When the undecomposed object material has a specific gravity greater than that of the hydrothermal solution (solvent), procedure contrary to the above will be performed. Thus, the opening of the automatic open/close valve 109 is monitored, while input volume of the hydrothermal solution (solvent) is monitored. The undecomposed object material in a volume corresponding to the input volume may be discharged.

When the undecomposed object material is in a solid form, or a mixture of gas, liquid and solid, the above procedure may be appropriately combined in order to embody a recycling treatment system.

When the hydrothermal solution (solvent) and the undecomposed object material in the tank 106 are uniformly admixed with each other, they may be directly recycled to the hydrothermal reaction apparatus. If the hydrothermal solution (solvent) has been changed in its composition due to the chemical reaction, appropriate material may be added for supplement thereof.

For example, insulation oil containing PCB is decomposed using sodium hydroxide solution as a hydrothermal solution (solvent), sodium hydroxide solution and insulation oil containing PCB are discharged into the tank 106. The insulation oil containing PCB and sodium hydroxide solution are separated to form two respective phases. The insulation oil containing PCB is in the upper phase and the sodium hydroxide solution is in the lower phase. Concentration of PCB in the insulation oil containing PCB and concentration of PCB slightly dissolved in the sodium hydroxide solution are measured. If the concentration in the oil phase exceeds a predetermined value, the insulation oil containing PCB is recycled through the conduit 113 into the object material tank 53, according to FIG. 20. The sodium hydroxide solution is controlled for its concentration and recycled to the hydrothermal solution (solvent) tank 54 for re-treatment thereof. Thus, decomposition may be performed reliably. If the target value is not obtained after recycling, the above recycling procedure may be repeated until such target value is achieved. In accordance with the present treatment method, it is possible to realize a complete closed system, so that any risk of leakage out of the system is not expected, whereby safe and reliable decomposition may be performed.

Results from decomposition test for freon 12 ($CCl_2F_2$) according to the recycling system shown in FIG. 19 will be explained. In order to prolong the reaction time, a warmer 37' is provided in addition to the reactor units 37. The warmer 37' includes a 160 m piping 41 of the same material, and the same inner and outer diameter as the piping 41 of the reactor units 37, the piping being wound in a spiral configuration. The length of the piping of the reaction device 36 is 352 m throughout the four-staged reactor unit 37, warmer 37", reactor unit 37 and warmer 37".

A quantity of water is supplied to the high-pressure injection pump 33 through the flow passage change-over valve 51. The flow rate of the water is 150 cc/min. at 200 kg/cm$^2$. The water flows through the heat exchanger 35 into the reaction device 36. The flow rate is controlled by means of the opening of the pressure regulating valve 39, and the pressure regulated by remotely controlling the outlet pressure of the high-pressure injection pump 33 by means of the control panel and the control computer. Then, each of the reactor units 37 of the reaction device 36 and the warmers 37" are set at a set value of 330° C. When the reactor units 37 and the warmers 37" are confirmed to be at the set value, the flow passage change-over valve 51 is changed to be connected with the flow passage from the object liquid, and then 2M-sodium hydroxide solution is supplied at a rate of 300 cc/min.

Freon 12 as an object material to be treated is supplied by means of the high-pressure injection pump 56 at a rate of 6 cc/min. The fluid containing the object material (after being treated) to be decomposed passes through the reaction device 36 within 35 minutes or less. The fluid flows through the heat exchanger 35 and the cooler 38, and then reduced in its pressure by means of the pressure regulating valve 39. Consequently, the fluid was discharged into the tank 106 for receiving the treated liquid. Under the above condition, 99.95% of the freon 12 is decomposed. Sodium hydroxide solution as a hydrothermal solution (solvent) is contained in the treated liquid.

The temperature of the tank 106 is set at 60° C., so that undecomposed freon 12 contained in the treated liquid is separated from the treated liquid and transferred into a gas phase. Thus, the separated freon 12 is recycled through the conduit 112 for treatment thereof. The freon gas from the conduit 112 may be stored within a gas cylinder for subsequent treatment.

A large quantity of sodium hydroxide (NaOH) is contained in the treated liquid. Thus, the treated liquid is transferred through the conduit 111 to the tank 116 for performing concentration conditioning of the hydrothermal solution (solvent). Alkaline concentration of the treated liquid is regulated in the tank 116. Then, the treated liquid is recycled through the conduit 128 as a hydrothermal solution (solvent).

As mentioned above, undecomposed freon is re-treated, while recycling hydrothermal solution (solvent), in accordance with the invention. Thus, installation cost, installation space, agent cost, together with volume of waste liquid, may be reduced, while achieving reliable decomposition.

Organic chlorine compounds other than freon, such as trichlene for example, may be decomposed in a manner similar to that performed relative to freon, by using as hydrothermal solution various combinations of alkaline-methanol, alkaline aqueous solution or alkaline-hydrogen peroxide, metal ions or solid catalyst.

It is known that trichlene in waste water may be removed by means of activated carbon absorption method. In such a case, activated carbon having trichlene absorbed thereon may be admixed with alkaline-methanol aqueous solution so as to be treated in accordance with the above mentioned method, whereby trichlene absorbed on the activated carbon may be decomposed, while recycling the activated carbon. It is also known that activated carbon is continuously supplied into waste water. In such a case, activated carbon contaminated with trichlene may be disposed within a pipeline at an appropriate position. A filter is disposed so as to prevent the activated coal from being flown away. Then, alkaline-methanol solution is continuously supplied for extraction of trichlene from the activated carbon and decomposition of the trichlene. It is also possible to cause trichlene to be extracted from the activated carbon, and thereafter alkaline-methanol solution is injected for decomposition of trichlene. If decomposition is insufficient, trichlene is returned to the treatment apparatus for hydrothermal treatment thereof. Such procedures may be applied not only to extractive removal and decomposition of trichlene contained in activated carbon, but also to hydrothermal treatment of object material to be decomposed contained in a solid or powder material, for example, treatment of dioxine contained in fly ash.

When polyethylene is treated in a supercritical water at 500° C., it may be very quickly decompose into low molecular compounds including straight chain hydrocarbons such as paraffin and olefin, and aromatic hydrocarbons, or combinations thereof. Organic compounds such as paraffinic hydrocarbons and olefinic hydrocarbons may be efficiently modified into aromatic hydrocarbons, by appropriately controlling the temperature of the supercritical water, maintaining a continuous gradient in treatment temperature, and treatment time. Depending on a given case, cokes may be generated during the course of polyethylene being decomposed into low molecular compounds. It is noted, however, that it is possible to obtain light oily matter while restricting generation of cokes, by injecting hydrogen gas by means of the reaction inhibitor injection means 60.

As will be appreciated from the foregoing, the present invention realizes continuous and efficient reaction treatment in hydrothermal reaction such as supercritical water reaction. Treated material, no matter in a solid form or in a solid/liquid/gas mixture, may be smoothly transferred. Thus, a continuous hydrothermal reaction apparatus may be provided which is superior in terms of reliability and safety, and which may be settable in its treatment condition to a variety of substances to be treated.

What is claimed is:

1. A hydrothermal reaction apparatus, comprising:
   an object fluid receiving tank for accommodating the object material to be treated and a hydrothermal solvent containing water,
   a high-pressure injection pump in communication with said tank via a flow passage change-over valve for switching to and from a water injection passage,
   a reactor having heating means formed of pipes in sequence, and
   a pressure reducing means,
   wherein the object fluid can be forced into said reactor by means of said high-pressure injection pump and the thermally decomposed fluid after treatment can be discharged via the pressure reducing means,
   said apparatus characterized by said reactor being composed of a preheater and a warmer formed of curved pipes and quick heating means provided in a piping that connects said preheater to said warmer,
   said flow passage change-over valve constructed so that upon start of the apparatus, it communicates with said water injection passage so that water is injected into said reactor by means of said high-pressure injection pump,
   said flow passage change-over valve being subsequently switchable to the object fluid receiving tank so that said object fluid can be forced into said reactor by means of said high-pressure injection pump with pressure maintained at a level not lower than where water is about at a supercritical condition, said injected object fluid being preheated by means of said preheater to a temperature near the point where the reaction starts and then rapidly heated by the quick heating means to a reaction temperature not lower than a level where water is about at a supercritical condition and subsequently warmed at said reaction temperature by means of said warmer while, at the same time, the opening of said pressure reducing means is controlled such that the object fluid flows through the pipes in the reactor under a turbulent condition to decompose the object material.

2. The hydrothermal reaction apparatus according to claim 1, wherein the heating means in said preheater and said warmer are each composed of a plurality of independently controllable reactor units that are connected to each other and which include unitary heating means.

3. The hydrothermal reaction apparatus according to claim 2, wherein the heating means in said preheater and said warmer is composed of a unitary assembly of a hot plate block made of a heat conductive material having a plurality of apertures formed therein and cartridge heaters disposed in said apertures.

4. The hydrothermal reaction apparatus according to claim 2, wherein the heating means is hot air supply means.

5. The hydrothermal reaction apparatus according to claim 1, wherein the quick heating means is an induction heater.

6. The hydrothermal reaction apparatus according to any one of claims 1–5, wherein the pressure reducing means is a pressure regulating device.

7. The hydrothermal reaction apparatus according to any one of claims 1–5, which includes separate tanks for accommodating the object fluid and the hydrothermal solvent and which communicate with the reactor via flow passage change-over valves.

8. The hydrothermal reaction apparatus according to any one of claims 1–5, wherein a reaction controller injection means having a tank and a high-pressure injection pump connected to each other is provided in communication via a check valve with a connecting portion between selected two of said reactor units which are connected together to form the warmer, such that a quantity of a reaction accelerator, a reaction inhibitor or the hydrothermal solvent can be injected.

9. The hydrothermal reaction apparatus according to claim 7, wherein the tank accommodating the object material comprises a container filled with the object material, means for heating said container, and means for liquefying a quantity of gas supplied from said container.

10. The hydrothermal reaction apparatus according to any one of claims 1–5, wherein said pressure reducing means communicates with a drainage tank for receiving the treated object fluid such that said treated object fluid is introduced into a means of regulating the concentration of the hydrothermal solvent to be adjusted to a value comparable to its initial concentration in the object fluid with the treated object fluid of the adjusted solvent concentration being injected again into said reactor.

11. The hydrothermal reaction apparatus according to claim 9, wherein said pressure reducing means communicates with a drainage tank having means of heating the treated object fluid such that said treated object fluid is heated and separated into the undecomposed object material and the hydrothermal solvent in said drainage tank, with the undecomposed object material being introduced into the tank accommodating the object material whereas the hydrothermal solvent is introduced into a means of regulating the concentration of the hydrothermal solvent to be adjusted to a value comparable to its initial concentration in the object fluid and then introduced into the tank accommodating the solvent, with the treated object fluid being injected again into said reactor.

* * * * *